United States Patent
Kodama et al.

(10) Patent No.: US 7,912,139 B2
(45) Date of Patent: Mar. 22, 2011

(54) MULTI-CARRIER COMMUNICATION APPARATUS, POWER LINE COMMUNICATION CIRCUIT, AND MULTI-CARRIER COMMUNICATION METHOD

(75) Inventors: Nobutaka Kodama, Fukuoka (JP); Hisao Koga, Fukuoka (JP); Mutsuhiko Oishi, Fukuoka (JP); Ryota Yukizane, Fukuoka (JP); Fumio Ichihara, Fukuoka (JP)

(73) Assignee: Panasonic Corporation, Osaka (JP)

( * ) Notice: Subject to any disclaimer, the term of this patent is extended or adjusted under 35 U.S.C. 154(b) by 888 days.

(21) Appl. No.: 11/696,011

(22) Filed: Apr. 3, 2007

(65) Prior Publication Data
US 2008/0013637 A1    Jan. 17, 2008

(30) Foreign Application Priority Data

Apr. 3, 2006 (JP) .............. P.2006-101777
Jul. 21, 2006 (JP) .............. P.2006-199596

(51) Int. Cl.
*H04L 27/28* (2006.01)
(52) U.S. Cl. ...................................... 375/260
(58) Field of Classification Search ............... 375/260, 375/316, 326, 222; 370/419, 480
See application file for complete search history.

(56) References Cited

U.S. PATENT DOCUMENTS

| | | | |
|---|---|---|---|
| 6,944,232 B2 | 9/2005 | Koga et al. | |
| 7,010,062 B2 * | 3/2006 | Joshi et al. | 375/326 |
| 7,023,324 B2 | 4/2006 | Kodama et al. | |
| 7,164,724 B2 | 1/2007 | Koga et al. | |
| 2004/0184400 A1 | 9/2004 | Koga et al. | |
| 2004/0190657 A1 * | 9/2004 | Seki et al. | 375/347 |
| 2005/0008086 A1 | 1/2005 | Koga et al. | |
| 2005/0031048 A1 | 2/2005 | Koga et al. | |
| 2005/0037722 A1 | 2/2005 | Koga et al. | |
| 2005/0238089 A1 | 10/2005 | Kodama et al. | |
| 2005/0238109 A1 | 10/2005 | Koga et al. | |
| 2006/0120472 A1 * | 6/2006 | Joshi et al. | 375/260 |
| 2006/0133528 A1 | 6/2006 | Koga et al. | |

FOREIGN PATENT DOCUMENTS

| | | |
|---|---|---|
| JP | 2000165304 | 6/2000 |
| JP | 2003288747 | 10/2003 |

* cited by examiner

*Primary Examiner* — Khai Tran
(74) *Attorney, Agent, or Firm* — Dickinson Wright PLLC

(57) ABSTRACT

Provided is a multi-carrier communication apparatus, power line communication circuit, and multi-carrier communication method capable of decreasing omission of carrier detection even when a plurality of communication apparatuses are simultaneously transmitting signals at the state of time discord. Digital signals transmitted from a digital signal-processing unit 1 are converted into analog signals by an analog circuit unit 2 and then transmitted from a pair of lines 61 and 62 via a communication transformer 3. The digital signal-processing unit 1 has a frequency carrier detecting unit 10 which detects the existence of a carrier on the basis of a frequency characteristic of the received signal and the frequency carrier detecting unit 10 detects the carrier by taking correlation between sub-carriers adjacent to each other at every other interval.

15 Claims, 17 Drawing Sheets

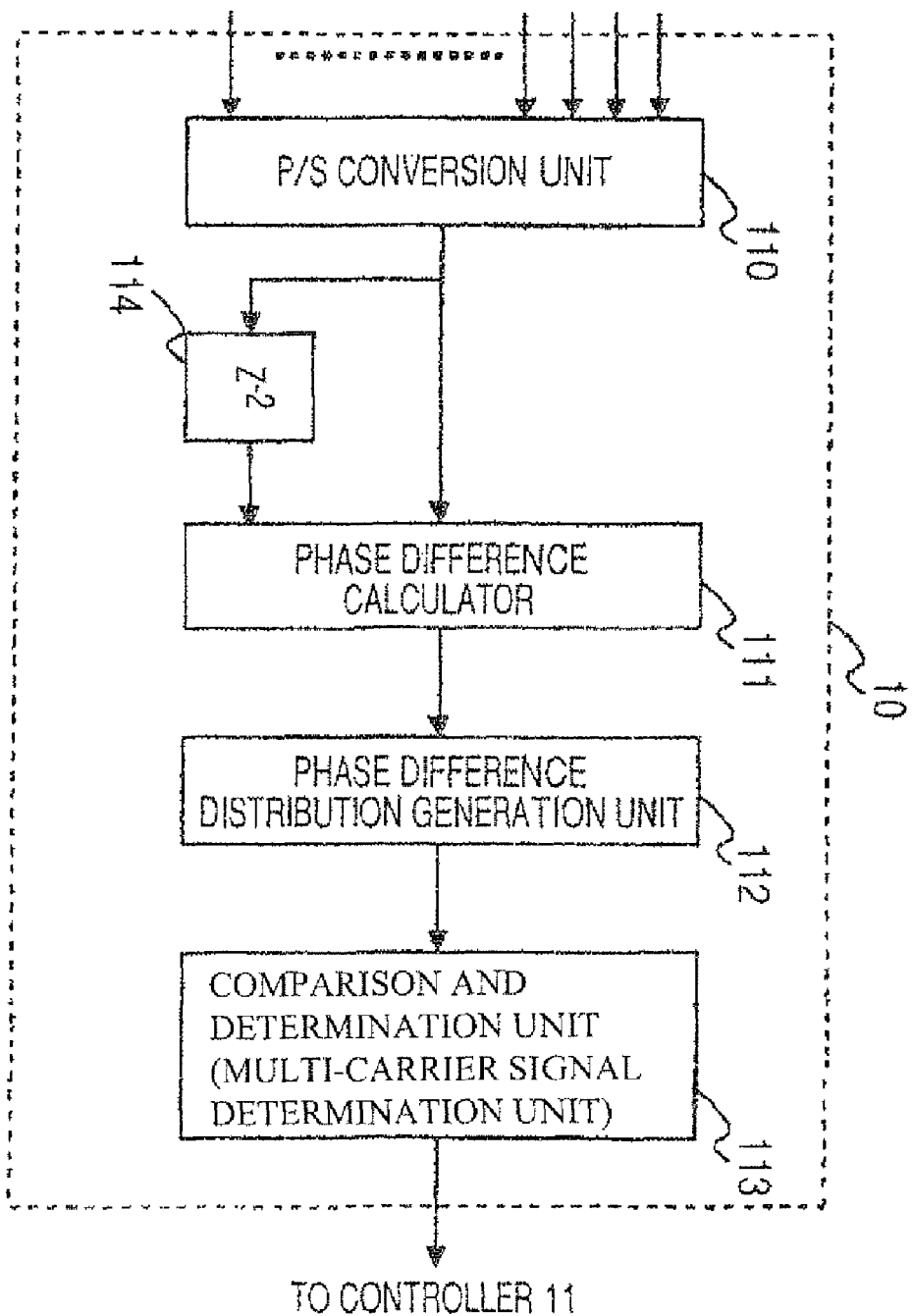

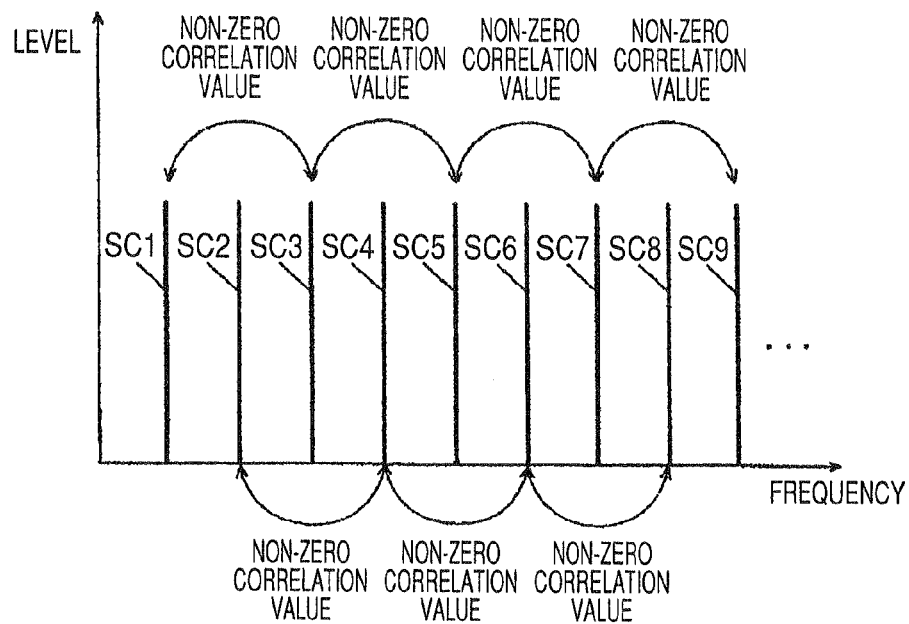
FIG. 7 — CASE THAT THERE IS NO TIME DISCORD BETWEEN TWO COMMUNICATION APPARATUSES
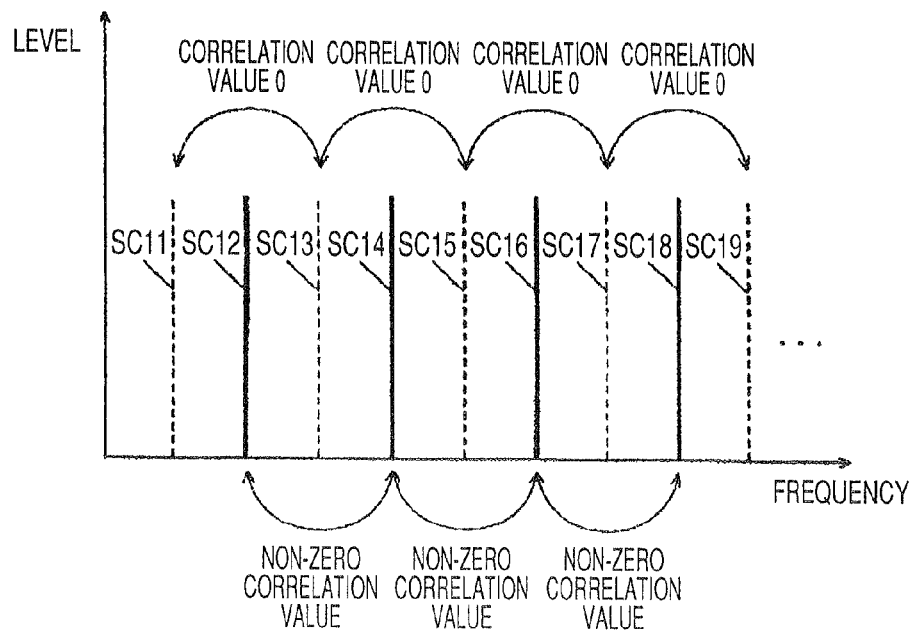
FIG. 8 — CASE THAT THERE IS TIME DISCORD BETWEEN TWO COMMUNICATION APPARATUSES (FOR EXAMPLE, Ts/2)

s(t): RECEIVED WAVEFORM DATA
F: FREQUENCY DATA (SUB-CARRIER DATA) AFTER FFT
N: OFDM SYMBOL PERIOD (FFT SAMPLE NUMBER)
icc: CORRELATION VALUE
A,B,C,D,E: DISTRIBUTION INFORMATION
M: TOTAL CORRELATION NUMBER BETWEEN CARRIERS
m: DISTRIBUTION INFORMATION (MAXIMUM VALUE)
Th: THRESHOLD
Crredet: CARRIER DETECTION SIGNAL

MULTI-CARRIER COMMUNICATION APPARATUS, POWER LINE COMMUNICATION CIRCUIT, AND MULTI-CARRIER COMMUNICATION METHOD

BACKGROUND

The present invention relates to a multi-carrier communication apparatus, a power line communication circuit, and a multi-carrier communication method which perform communication using a plurality of carriers.

A transmission method using a plurality of sub-carriers such as an orthogonal frequency division multiplexing (OFDM) method has a big advantage that a high quality of communication is possible even on an extremely poor conditioned transmission line. Accordingly, it is used in the wired communication such as a power line communication as well as the wireless communication.

In a multi-carrier communication apparatus using the plurality of sub-carriers to perform communication, a transmitter converts bit data which are scheduled to be transmitted into symbol data, performs symbol mapping in accordance with the symbol data, converts them into data on a time domain by performing the inverse fast Fourier transform (FFT) or inverse wavelet transform, and converts them into a baseband analog signal by performing the serial-parallel conversion and DA conversion, and then sends the converted signal. Conversely, a receiver converts the received signal into digital signal by performing the AD conversion, converts them into data on a frequency domain by performing the serial-parallel conversion and then the FFT conversion or wavelet conversion, and obtains received bit data by performing demapping.

In this manner, the multi-carrier communication apparatus has a carrier-detecting function to determine whether other apparatuses are transmitting signal to the transmission line or not. Accordingly, when other apparatus do not use the transmission line, the multi-carrier communication apparatus performs a transmitting process on demand.

The carrier detection of the multi-carrier communication apparatus, as disclosed in US 2005-0037722A1, for example, is performed on the basis of a signal after digital waveform data converted by means of the AD converter are converted into data on the frequency domain.

In such a carrier detection method based on the signal having been converted into the data on the frequency domain, since a correlation between the adjacent sub-carriers is computed on the frequency domain by taking advantage of the OFDM's characteristics that the plurality of sub-carriers are arranged at a constant interval, it is possible to detection the carrier with a high precision.

However, the carrier detection method can detect the carrier when a signal is transmitted from one communication apparatus on the transmission line or when signals are transmitted from two communication apparatuses or more at the same time without time discord. However, when the signals are transmitted from two communication apparatuses or more at the same time at the state of the time discord, there is a case that the carrier cannot be detected in spite of the fact that the signals exist. Accordingly, the communication apparatuses which cannot detect the carrier judge that the signals do not exist and transmit signals to the transmission line. As a result, when collision of the transmitted signals happens in series, there is an occasion when communication is impossible.

When signals are transmitted from two communication apparatuses on the transmission line at the same time without the time discord in FIG. 24, there are frequency spectrums of all sub-carriers (non-zero) in FIG. 25. Accordingly, correlation between the adjacent sub-carriers can be taken. On the other hand, when the signals are transmitted at the same time at the state of the time discord by an OFDM symbol period (Ts) in FIG. 26, levels of the sub-carriers become 0 at every other interval in FIG. 27. Accordingly, the correlation between the adjacent sub-carriers cannot be taken. That is, it cannot be recognized that a desired carrier exists on the transmission line

SUMMARY

The invention, as disclosed in consideration of the problem, is to provide a multi-carrier communication apparatus, power line communication circuit, and multi-carrier communication method which can decrease omission of the carrier detection even when the plurality of communication apparatuses transmit the signals at the same time at the state of the time discord.

Major characteristics of the invention are that phase differences between a plurality of complex signals each corresponding to two frequencies which are not adjacent to each other on the frequency domain are calculated, distribution of signal points on the complex coordinates corresponding to the phase difference are generated, and it is judged on the basis of the distribution of the generated signal points whether the signals which signal receivers receive are multi-carrier signals which signal transmitters transmit or not.

According to the invention, even when the plurality of communication apparatuses transmit the signals at the same time at the state of the time discord, a multi-carrier communication apparatus, power line communication circuit, and multi-carrier communication method which can decrease omission of the carrier detection can be provided.

According to a first aspect of the invention having made to solve the above-mentioned problems, there is provided a multi-carrier communication apparatus which receives a multi-carrier signal from other multi-carrier communication apparatuses via a transmission line, the multi-carrier communication apparatus includes a complex signal-transformer which transforms time-domain signals from the transmission line into at least three complex signals corresponding to frequencies different from each other; a phase difference-calculator which calculates a phase difference between a pair of the complex signals among the at least three complex signals which are not adjacent to each other on a frequency domain; and a multi-carrier signal-determining unit which determines whether the time-domain signals from the transmission line are the multi-carrier signals from the other multi-carrier communication apparatuses on the basis of the phase difference.

In such a configuration, even when the plurality of communication apparatuses transmit the signals at the state of the time discord, omission of the carrier detection can be decreased. Accordingly since re-collision of the signals can be prevented, a case that communication is impossible for a long time can be avoided.

According to a second aspect of the invention having made to solve the above-mentioned problems, there is provided a multi-carrier communication apparatus which receives a multi-carrier signal from other multi-carrier communication apparatuses via a transmission line, the multi-carrier communication apparatus including a complex signal-transformer which transforms time domain signals from the transmission line into a first complex signal corresponding to a first frequency, a second complex signal corresponding to a second frequency, and a third complex signal corresponding to a third complex signal, where the third frequency is larger than the second frequency and the second frequency is larger than the first frequency, and the first complex signal has a first phase and the third complex signal has a third phase; a phase difference-calculator which calculates a difference of the first phase and the third phase; and a multi-carrier signal-determining unit which determines whether the time signals from the transmission line are the multi-carrier signals from other multi-carrier communication apparatuses on the basis of the phase difference.

In such a configuration, even when the plurality of communication apparatuses transmit the signals at the state of the time discord, omission of the carrier detection can be decreased. Accordingly since re-collision of the signals can be prevented, a case that communication is impossible for a long time can be avoided.

According to a third aspect of the invention having made to solve the above-mentioned problems, there is provided a power line communication circuit which performs communication by using a power line including a coupler separating a communication signal from an alternating voltage of the power line; a filter block which is connected to the coupler and to which the communication signal separated by the coupler is inputted; an AD converter which is connected to the filter block and converts the communication signal passed through the filter block into a digital signal, wherein the filter block has a plurality of high-pass filters having mutually different cutoff frequencies, a plurality of low-pass filters having mutually different cutoff frequencies, a selector passing the communication signal separated by the coupler, selecting at least one high-pass filter and one low-pass filter among the plurality of high-pass filters and the plurality of low-pass filters.

In such a configuration, even though only one of the high pass filters and only one of the low pass filters are provided on every cutoff frequency, the plurality of pass band filters can be configured. Accordingly, the number of the filters decrease in number overall, thereby capable of dealing with the band-separated operation and decreasing in size.

According to a fourth aspect of the invention having made to solve the above-mentioned problems, there is provided a multi-carrier communication method of receiving a multi-carrier signal from other multi-carrier communication apparatuses via a transmission line, the method including the steps of transforming time domain signals coming from the transmission line into three or more complex signals corresponding to mutually different frequencies; calculating a phase difference between a pair of the complex signals which are not adjacent to each other on a frequency domain among the three or more complex signals; and determining whether the time domain signals coming from the transmission line are the multi-carrier signals on the basis of the phase difference.

In such a configuration, even when the plurality of communication apparatuses transmit the signals at the state of the time discord, omission of the carrier detection can be decreased.

BRIEF DESCRIPTION OF THE DRAWINGS

FIG. 6 is a schematic functional block diagram illustrating an example of a frequency carrier detecting unit in the multi-carrier communication apparatus according to the Embodiment 1.

FIG. 7 is a diagram illustrating an example of a spectrum pattern when two signals from two communication apparatuses are outputted on a transmission line without time discord in the multi-carrier communication apparatus according to the Embodiment 1.

FIG. 8 is a diagram illustrating an example of a spectrum pattern when two signals from two communication apparatuses are outputted on a transmission line at the state of time discord in the multi-carrier communication apparatus according to the Embodiment 1.

DETAILED DESCRIPTION

Hereinafter, embodiments of the invention will be described with reference to drawings.

Embodiment 1

A communication apparatus having a transmitting function and receiving function will be described below, but it does not necessarily need the transmitting function and may have the receiving function. A multi-carrier communication apparatus shown in FIG. 1 is one example of a multi-carrier receiving apparatus.

Figure 1:
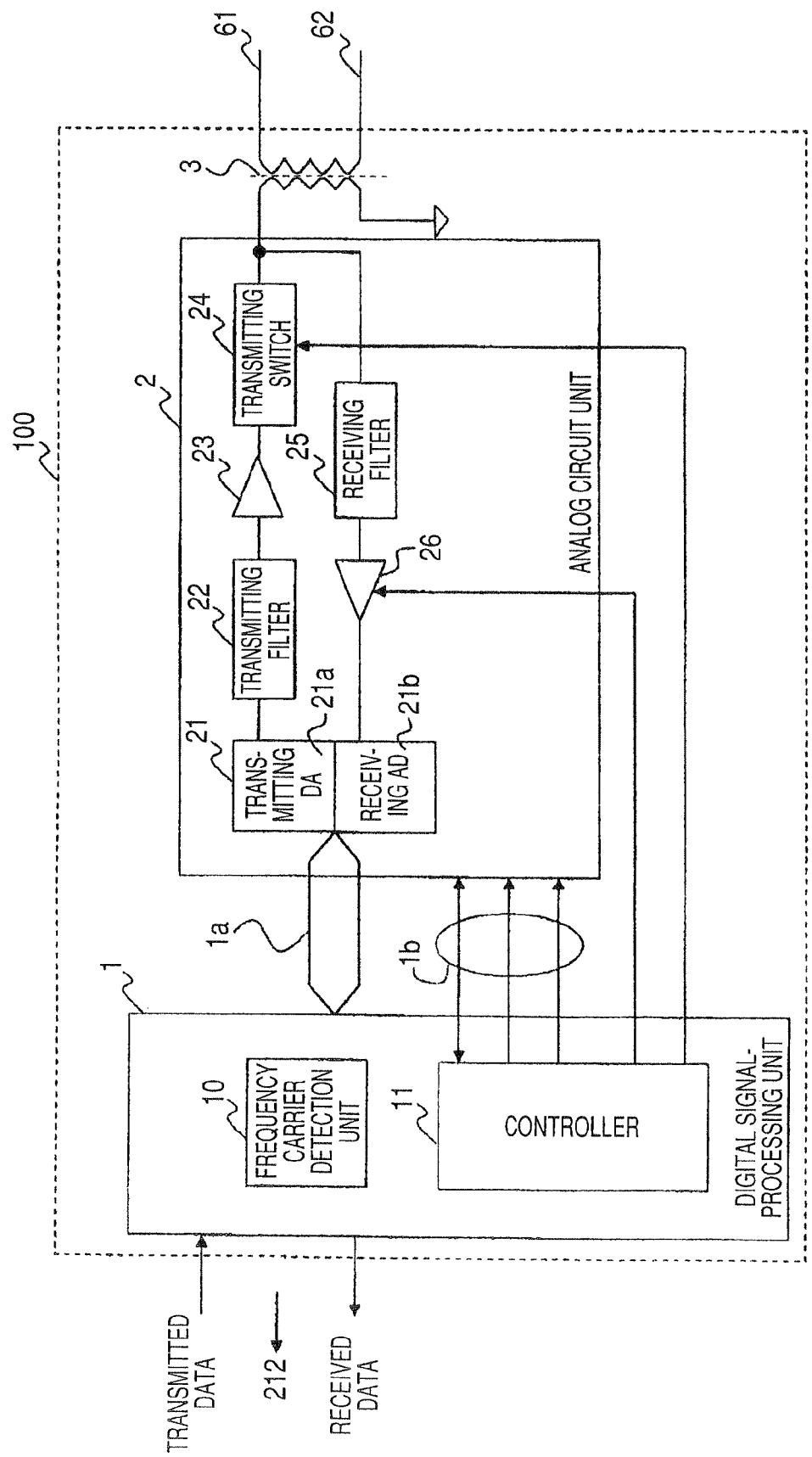
FIG. 1 is a diagram showing an overall configuration of a multi-carrier communication apparatus according to the Embodiment 1.

As shown in FIG. 1, a multi-carrier communication apparatus 100 performs communication via transmission lines constituted by a pair of lines 61 and 62 such as a power line. The multi-carrier communication apparatus 100 shown in FIG. 1 includes a digital signal-processing unit 1, an analog circuit unit 2, and a coil transformer 3.

The digital-processing unit 1 is constituted by one or a plurality of digital LSI, for example, and it controls signal path, gain, and the like of each unit in the analog circuit unit 2 as well as modulating digital transmission data to generate digital transmission signals and demodulating the digital reception signal to generate digital reception data. The analog circuit unit 2 is constituted by analog chips and discrete components. A digital signal 1a is transmitted to an A/D and D/A conversion circuit 21 of the analog circuit unit 2 and is inputted from the A/D and D/A conversion circuit 21. Every kind of control signal and state signals 1b are inputted and outputted between the digital signal-processing unit 1 and the analog circuit unit 2. A modulation and demodulation process in the digital signal-processing unit 1 is performed by using a plurality of sub-carriers and, for example, the OFDM using the Fourier transform.

The digital signal-processing unit 1 includes a frequency carrier detecting unit 10 detecting the existence of the carriers by using a frequency characteristic of a received signal and a controller 11 controlling the entire communication apparatus including a carrier detection control.

In addition, the digital signal-processing unit 1 is realized in a main IC 201 as described below and the controller 11 is realized in a CPU 201A of the main IC 201. Further, the frequency carrier detecting unit 10 is realized in a PLC/PHY block 201B of the main IC 201.

The analog circuit unit 2 includes the A/D and D/A conversion circuit 21, a transmitting filter 22, a transmitting AMP 23, a transmitting switch 24, a receiving filter 25, and a variable gain amplifier (VGA) 26.

The A/D and D/A conversion circuit 21 includes a transmitting DA converter 21a converting the digital signals 1a coming from the digital signal-processing unit 1 into an analog transmission signal and a receiving AD converter 21b converting the analog reception signal coming from the variable gain amplifier (VGA) 26 into the digital reception signal. The transmitting filter 22 is a low filter removing a harmonic noise generated due to the DA conversion of the transmitting DA converter 21a. The transmitting AMP 23 amplifies transmitting power of the analog transmission signal. The transmitting switch 24 switches the transmitted and received signals and it switches impedance at the time of transmitting and receiving the signals as well as muting the transmitting AMP 23 at the time of receiving the signals.

The receiving filter 25 is a band filter removing frequency noise other than a communication band. The variable gain amplifier (VGA) 26 amplifies the analog reception signals and adjusts the analog reception signals to a voltage having a resolution suitable for the AD converter 21b.

The coil transformer 3 switches communication signals to a first circuit of the communication apparatus 100 and a second circuit of the transmission lines, and then transmits and receives the signals.

Figure 2:
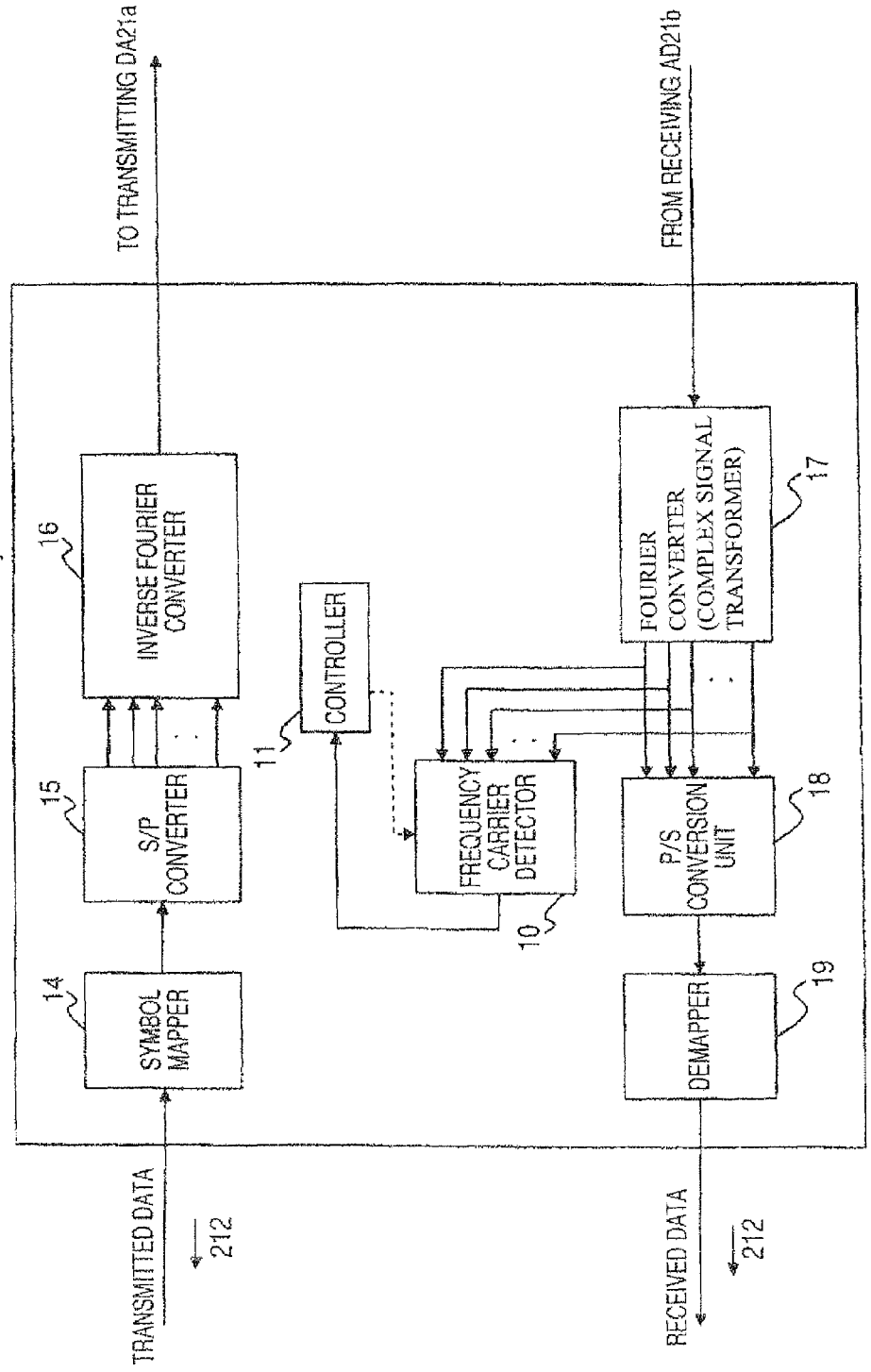
FIG. 2 is a diagram showing an overall configuration of a digital signal-processing unit of the multi-carrier communication apparatus according to the Embodiment 1.

As shown in FIG. 2, the digital signal-processing unit 1 has a symbol mapper 14, a serial-parallel converter (S/P converter) 15, an inverse Fourier converter 16, a Fourier converter 17, a parallel-serial converter (P/S conversion unit) 18, and a demapper 19 in addition to the controller 11 and the frequency carrier detecting unit 10.

The symbol mapper 14 converts bit data which is to be transmitted into symbol data and performs a symbol mapping (for example, a quadrature amplitude modulation (QAM)) in accordance with each symbol data. The serial-parallel converter (S/P converter) 15 converts the mapped serial data into parallel data. The inverse Fourier converter 16 takes the inverse Fourier transform to convert the parallel data into data on time domain and generates a series of sample values representing transmission symbols. The data are transmitted to the sending DA converter 21a of the analog circuit unit 2.

The Fourier converter 17 receives time-domain signals representing a time waveform as received digital data and carries out a time-frequency conversion of the received digital data. Specifically, the received digital data obtained from the receiving AD converter 21b of the analog circuit unit 2 (a series of sample values sampled at the same rate as the time of transmitting signals) are converted on the frequency domain by using the discrete Fourier transform. The Fourier converter 17 generates a plurality of complex signals each corresponding to a plurality of frequencies within a usable frequency band by using the discrete Fourier transform. The complex signal means a signal point on the complex coordinates (not shown) and the plurality of complex signals constitute frequency data (spectrum pattern) of the received signals. When the received signals are multi-carrier signals, the complex signals are represented as sub-carriers on the spectrum pattern.

The usable frequency band is in the range of 2 to 30 MHz, for example, but can be modified randomly. That is, the usable frequency band can be modified into the range of 4 to 28 MHz.

The P/S conversion unit 18 converts parallel data on the frequency domain into serial data. The demapper 19 obtains received data calculating an amplitude value or phase of each sub-carrier and judging the received signals.

The frequency carrier detecting unit 10 detects the existence of the carriers using a frequency characteristic of the received signals obtained from the Fourier converter 17. Specifically, it detects the existence of the carriers, evaluating complex information of each sub carrier and using correlation between the plurality of adjacent sub-carriers. In addition, when a real coefficient filter bank such as a wavelet is used, correlation between the sub-carriers is obtained by using two sub-carriers to complex sub-carriers. That is, the same or difference of the phase difference is evaluated by using the adjacent sub-carriers, and then when the peak of the correlation exceeds a predetermined value, it is judged that the correlation exists.

The controller 11 controls an overall operation of the multi-carrier communication apparatus 100.

Figure 3:
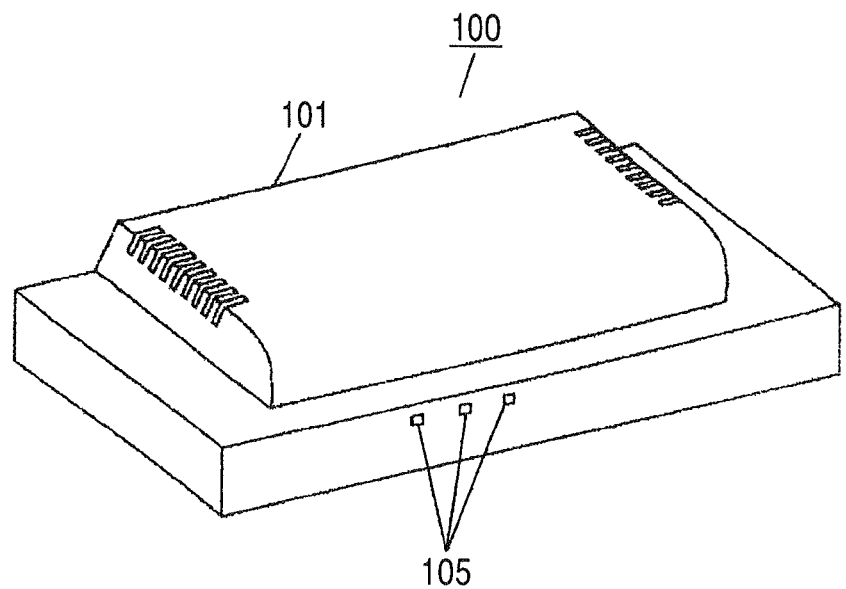
FIG. 3 is an outer perspective view illustrating a front face of a communication apparatus according to the Embodiment 1.
Figure 4:
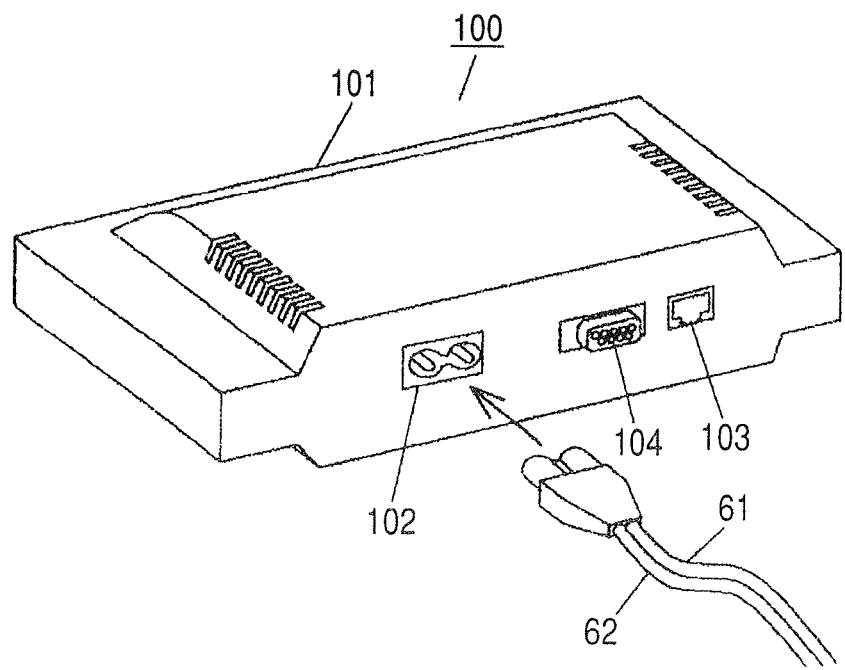
FIG. 4 is an outer perspective view illustrating a rear surface of the communication apparatus according to the Embodiment 1.

The multi-carrier communication apparatus 100 described above can be realized as a modem, for example, as shown in FIGS. 3 and 4. The multi-carrier communication apparatus 100 has a chassis 101. As shown in FIG. 3, display units 105 such as a light emitting diode (LED) are provided on the front face of the chassis 101. As shown in FIG. 4, a power supply connector 102, a modular jack 103 for a local area network (LAN) such as RJ 45, and a Dsub connector 104 are provided on the rear surface of the chassis 101. A pair of lines 61 and 62 such as a paralleled cable is connected to the power supply connector 102 as shown in FIG. 4. A LAN cable (not shown) is connected to the modular jack 103 for the LAN. A Dsub cable (not shown) is connected to the Dsub connector 104. In addition, as the example of the multi-carrier communication apparatus, the modem shown in FIGS. 3 and 4 is exemplified, but it is not limited to the modem having the private chassis, but can be built in other electrical apparatuses (for example, home appliances such as the television) as well. Further, electrical apparatuses (for example, home appliances such as the television) including a communication function therein can be also applied.

Figure 5:
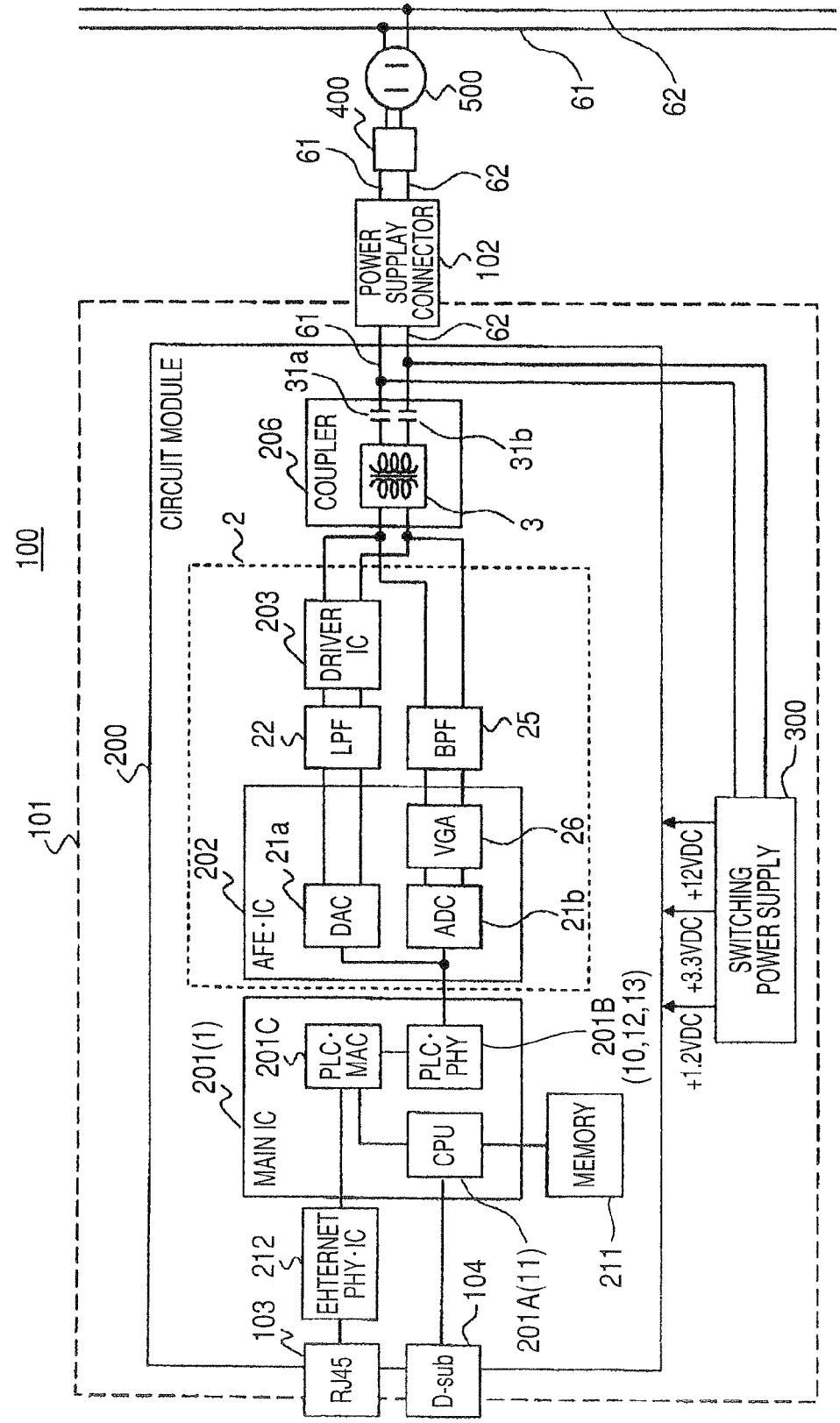
FIG. 5 is a block diagram illustrating an example of a hardware of the communication apparatus according to the Embodiment 1.

As shown in FIG. 5, the multi-carrier communication apparatus 100 has a circuit module 200 and a switching power supply 300. The switching power supply 300 supplies every kind of voltage (for example, +1.2 VDC, +3.3 VDC, and +12 VDC) to the circuit module 200. The circuit module 200 has a main integrated circuit (IC) 201, an analog front end integrated circuit (AFE•IC) 202, a low-pass filter (transmitting filter) 22, a driver IC 203, a coupler 206, a band-pass filter (receiving filter) 25, a memory 211, and an Ethernet (registered trademark) PHY•IC 212. The power supply connector 102 is connected to the pair of the lines 61 and 62 via a plug 400 and an outlet 500.

The main IC 201 is constituted by a central processing unit (CPU) 201A, a power line communication/media access control layer (PLC•MAC) block 201C, and a power line communication/physical layer (PLC•PHY) block 201B. The CPU 201A includes a 32-bit reduced instruction set computer (RISC) processor. The PLC•MAC block 201C manages the MAC layer of the transmitted signals and the PLC•PHY block 201B manages the PHY layer of the transmitted signals. The AFE•IC 202 is constituted by a DA converter (DAC) 21$a$, an AD converter (ADC) 21$b$, and a variable gain amplifier (VGA) 26. The coupler 206 is constituted by the coil transformer 3, coupler capacitor 31$a$ and 31$b$.

In addition, the digital signal-processing unit 1 shown in FIG. 1 is realized by the main IC 201, the controller 11 shown in FIG. 1 is realized by the CPU 201A, and the frequency carrier detecting unit 10 shown in FIG. 1 is realized by the PLC•PHY block 201B. Further, the analog circuit unit 2 is realized by the AFE•IC 202, the low-pass filter (transmitting filter) 22, the driver IC 203, and the band-pass filter (receiving filter) 25 shown in FIG. 5.

As shown in FIG. 6, the frequency carrier detecting unit 10 includes a parallel-serial converter (P/S conversion unit) 110, a 2-sample delayer ($Z^{-2}$) 114, a phase difference calculator 111, a phase difference distribution generation unit 112, a comparison determiner 113.

Figure 9:
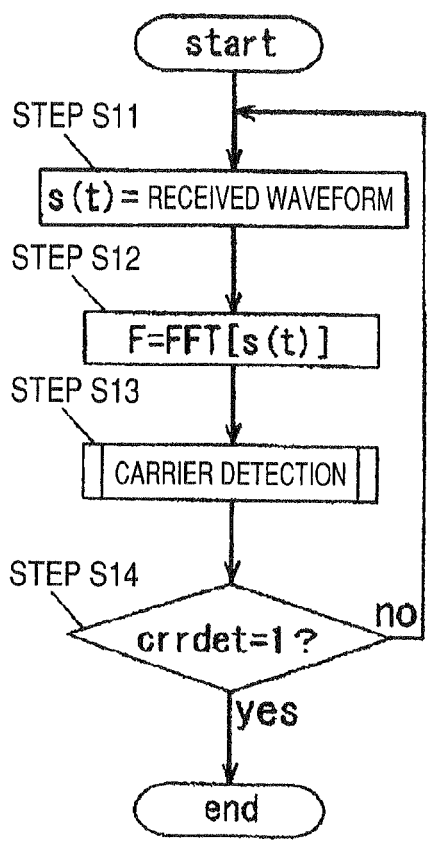
FIG. 9 is a flowchart showing an example of an operation in the multi-carrier communication apparatus according to the Embodiment 1.

The frequency carrier detecting unit 10 detects the existence of the carrier in accordance with the distribution state, calculating the phase difference between the sub-carriers from the frequency data obtained by the Fourier converter 17 as correlation values and evaluating the distribution of the phase difference. Hereinafter, "the correlation of the complex signals" is simply referred to as "complex correlation". The frequency carrier detecting unit 10 will be described below with reference to FIG. 6 referring a flowchart shown in FIG. 9.

The P/S conversion unit 110 converts the parallel data on the frequency domain converted by using the discrete Fourier transform by the Fourier converter 17 into the serial data. When the Fourier converter 17 receives received waveform data s(t) from received AD21$b$ in FIG. 9 (step S11), the received waveform data s(t) is converted by using the discrete Fourier transform to generate frequency data (sub-carrier data) F=FFT[s(t)] (step S12). When the frequency data is generated, the frequency carrier detecting unit 10 performs a carrier-detecting process (step S13, it will be described in detail below). When the carrier-detecting process is performed, the frequency carrier detecting unit 10 judges whether a carrier detection signal crrdet is "1" or not (step S14). When the carrier detection signal crrdet is not "1", that is, it is judged that the carrier is not detected (no in step S14), the process returns to step S11 to reiterate the above-described process. On the other hand, when the carrier detection signal crrdet is "1", that is, it is judged that the carrier is detected (yes in step S14), the process is ended.

Figure 10:
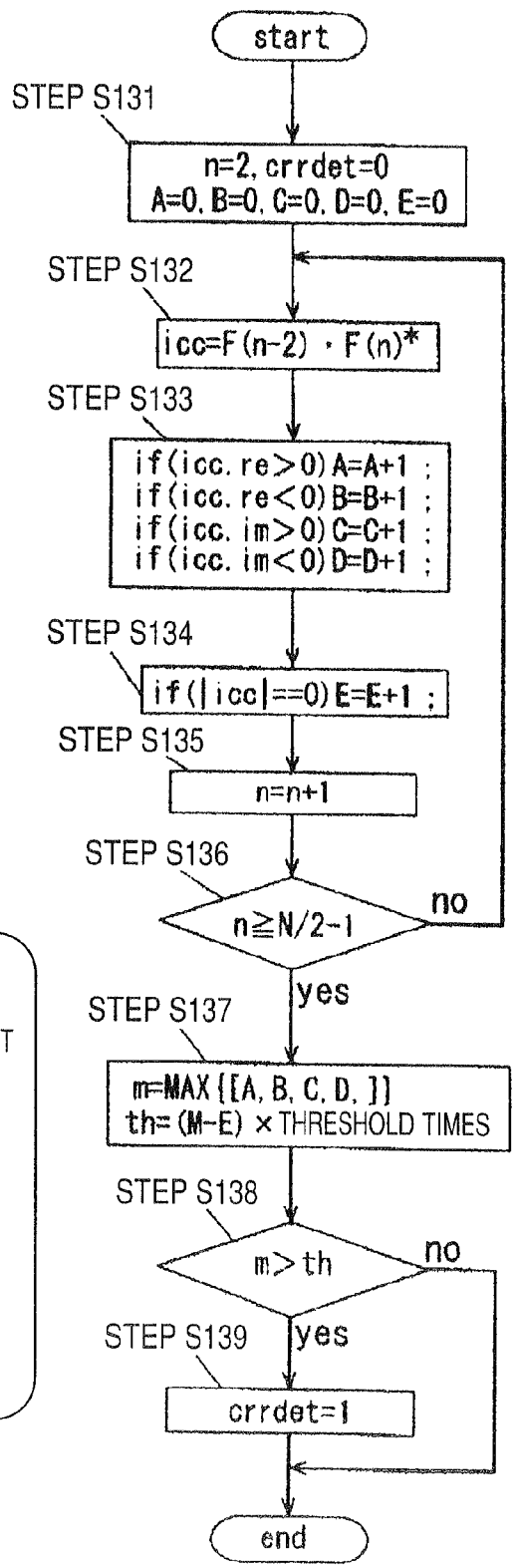
FIG. 10 is a flowchart showing a carrier detection process in detail in the multi-carrier communication apparatus according to the Embodiment 1.

Next, a carrier detection process will be described with reference to FIG. 10. The frequency carrier detecting unit 10, in the first place, initializes every variable necessary to perform the process (step S131). In this case, n indicates the number of the sub-carriers and A, B, C, and D indicate distribution information of the phase difference between the sub-carriers on the complex coordinates. Specifically, A, B, C, and D represent the distribution number on 0° to 180°, 180° to 360°, 90° to 270°, and 270° to 90° areas, respectively.

The phase difference calculator 111 calculates complex correlations each corresponding to frequencies which are not adjacent to each other on the frequency domain from the frequency data outputted from the Fourier converter 17. For example, the phase difference calculator 111 evaluates the phase difference between the sub-carriers as the correlation values between the complex signals, by calculating the complex correlation between the sub-carriers which are adjacent to each other at every other interval on the basis of the digital data of the P/S conversion unit 110 (step S132).

The 2-sample delayer 114 delays the frequency data as much as 2 samples in order to calculate the phase difference between the sub-carriers at every other interval. By taking correlation between the sub-carriers which are adjacent to each other at every other interval, the correlation values which are not 0 can be obtained regardless of the fact that there is time discord or no time discord as shown in FIGS. 7 and 8. FIG. 7 shows a spectrum pattern when two signals from two communication apparatuses are outputted on the transmission line without the time discord, and the sub-carriers SC1, SC2, SC3, . . . are arranged at the predetermined frequency on the frequency domain. In this case, since the OFDM is used, the phase difference between the sub-carriers SC1 and SC3 is not "0", and all correlation values do not become "0" (which is represented as "non-zero correlation value" in the drawing). Similarly, each correlation value is not "0" between the sub-carriers SC2 and SC4, SC3 and SC5, . . . .

FIG. 8 shows a spectrum pattern when two signals from two communication apparatuses are outputted on the transmission line at the state of time discord (for example, $T_s/2$), and the sub-carriers SC11, SC12, SC13, . . . are arranged at the predetermined frequency on the frequency domain. Since the phase difference between the sub-carriers SC12 and SC14, SC14 and SC16, . . . are not "0", all correlation values do not become "0" as the same as FIG. 7. On the other hand, since levels of the sub-carriers SC11, SC13, SC15, . . .

(dashed lines) are "0", the correlation values between sub-carriers SC11 and SC13, SC13 and SC15, . . . each become "0" (which is represented as "zero correlation value").

In addition, since it is fine that the phase difference here represents a phase difference between frequencies, a correlation value calculator calculating the correlation values between the sub-carriers can be provided instead of the phase difference calculator 111. Further, when the phase difference calculator 111 is capable of calculating a phase difference of the parallel input signal, the P/S conversion unit 110 can be omitted.

The phase difference distribution generation unit 112 evaluates distributions of the phase difference on the basis of the phase difference data of the phase difference calculator 111. Since the distributions are phases, the data thereof are in the range of 0° to 360°, but a resolution of the distribution is at discretion. The distribution of the signal points on the complex coordinates of 4 areas, 0° to 180°, 180° to 360°, 90° to 270°, and 270° to 90° is represented in the present embodiment. As for distribution information of the signal points, a counter is supplied in every area of the complex coordinates and the counter counts whenever the phase difference data correspond to the area (step S133). Further, the phase difference distribution generation unit 112 also counts the number of the correlation value of which the absolute value is 0 (step S134). The counted values are used when thresholds described below is determined. By subtracting the counted values from the total number of the correlation values of the calculated sub-carriers, the correlation values of non-zero correlation (which does not have a value) is excluded when it is judged whether there is the carrier or not The phase difference distribution generation unit 112 reiterates the process of the steps S132, S133, and S134 as much as the number of the sub-carriers. In practice, the sub-carrier number n increases (step S135) until the sub-carrier number n becomes less than half of the number N of the FFT samples (step 136). In addition, the phase difference distribution generation unit 112 evaluates the maximum value among the distribution information evaluated on all 4 areas and calculates the threshold from the number of the total correlation values which are subjects to be judged in order to give the values the comparison determiner 113 (step S137).

The comparison determiner 113 determines whether the maximum value m of the distribution information is larger than the threshold th, comparing largeness and smallness of the "the maximum value of the distribution information" and the "threshold" evaluated by the phase difference distribution generation unit 112 and outputting the carrier detection signal crrdet to the controller 11 as signals representing whether the carriers exist or not (step S138). In the case of the maximum value of the distribution information m>the threshold th, it can be considered that the correlation of the received signal is high, that is, the carrier exists on the transmission line (that is, the multi-carrier signal not noise exists). Accordingly, when the maximum value m of the distribution information is larger than the threshold th, the comparison and determination unit 113 determines that the carrier exists (yes in step S138) and then terminates the process, setting the carrier detection signal crrdet as 1. Conversely, when the maximum value m of the distribution information is smaller than the threshold th, the comparison determiner 113 determines that the carrier does not exist (no in step S138) and then sets the carrier detection signal crrdet as 0 (step 139).

As described above, the phase difference distribution generation unit 112 and the comparison determiner 113 output a signal representing whether the carrier exists or not, using the correlation of the frequency data used in communication.

When "the maximum value of the distribution information" is larger than "the threshold" described above, it is meant that the signal correlation of the frequency area used in the communication is high and since there is a strong possibility that the carrier exists on the transmission line, it is judged that the carrier exists.

The phase difference calculator 111 shown in FIG. 6 evaluates the phase difference between the sub-carriers which are adjacent to each other at every other interval as described above, but the phase difference at other intervals other than every other interval can be also used. For example, it can be judged whether the carrier exists or not when the sub-carriers are adjacent at 2 intervals.

In addition, the multi-carrier communication apparatus described above uses the Fourier transform or inverse Fourier transform at the time of the conversion between the time domain and frequency domain, but the wavelet transform and inverse wavelet transform can be also used. In this case, a wavelet converter and inverse wavelet converter are supplied instead of the Fourier converter 17 and inverse Fourier converter 16 shown in FIG. 2.

Next, an overall operation of the multi-carrier communication apparatus shown in FIG. 1 will be described. At the time of transmitting signals, the digitally transmitted signals generated in the digital signal-processing unit 1 are converted into the analog signals by the DA converter 21a of the AD/DA converting circuit 21 and then pass through the transmitting filter 22, the transmitting AMP 23, and the transmitting switch 24 to drive the coil transformer 3. Sequentially, the converted signals are outputted from the pair of lines 61 and 62 connected to the secondary winding of the coil transformer 3.

At the time of receiving the signals, the signals received from the pair of lines 61 and 62 are sent to the receiving filter 25 via the coil transformer 3. After the gain of the signals is adjusted by the variable gain amplifier (VGA) 26, the signals are converted into the digital signals by the AD converter 21b of the AD/DA converter circuit 21 and then are converted into digital data by the digital signal-processing unit 1. In this case, the transmitting switch 24 is at the OFF state.

Figure 11:
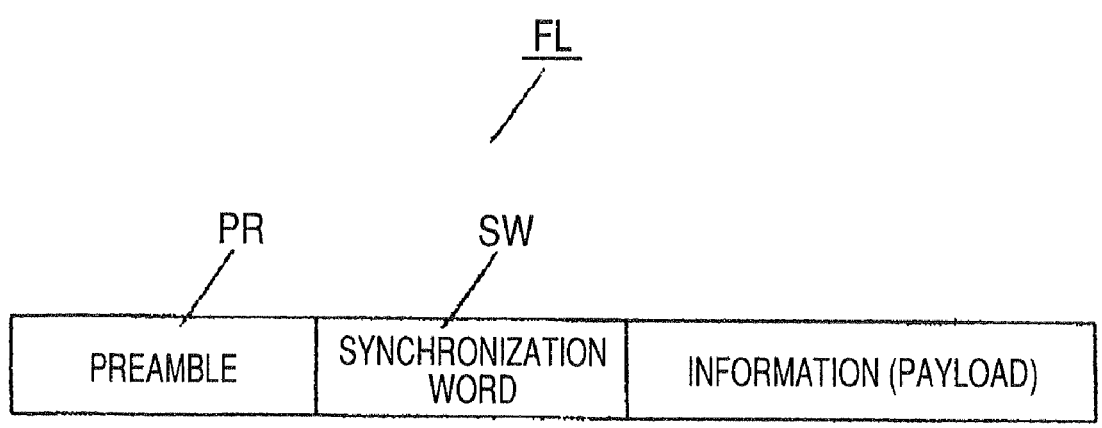
FIG. 11 is a diagram illustrating an example of a frame configuration of the transmitted data processed by the multi-carrier communication apparatus according to the Embodiment 1.

Next, the carrier detection operation will be described. FIG. 11 is a diagram illustrating an example of a frame configuration of the transmitted data processed by the multi-carrier communication apparatus according to the present embodiment. The transmitted data includes a preamble used in the carrier detection, synchronous process, equalization process, and the like, a synchronization word used to make synchronization, and information to be transmitted. As described above, the frequency carrier detecting unit 10 performs the carrier detection using the preamble PR or the synchronization word SW included in the frame FL. Since some data (for example, all the same values such as 1, 1, 1, . . . 1) are continuous in the preamble PR or synchronization word SW, the judgment about the correlation between the plurality of sub-carriers can be simply performed.

The multi-carrier communication apparatus connected to the power line to configure a communication system is described above, but the connected transmission line is not limited to the power line. For example, the transmission lines such as a telephone line, a coaxial cable can be also used.

The number of sub-carriers is not limited to the example shown in FIG. 7 and FIG. 8. If a multi-carrier signal has at least three sub-carriers, a phase difference calculator 113 can calculate the phase difference between a pair of sub-carriers which is not directly adjacent to each other.

Embodiment 2

Figure 12:
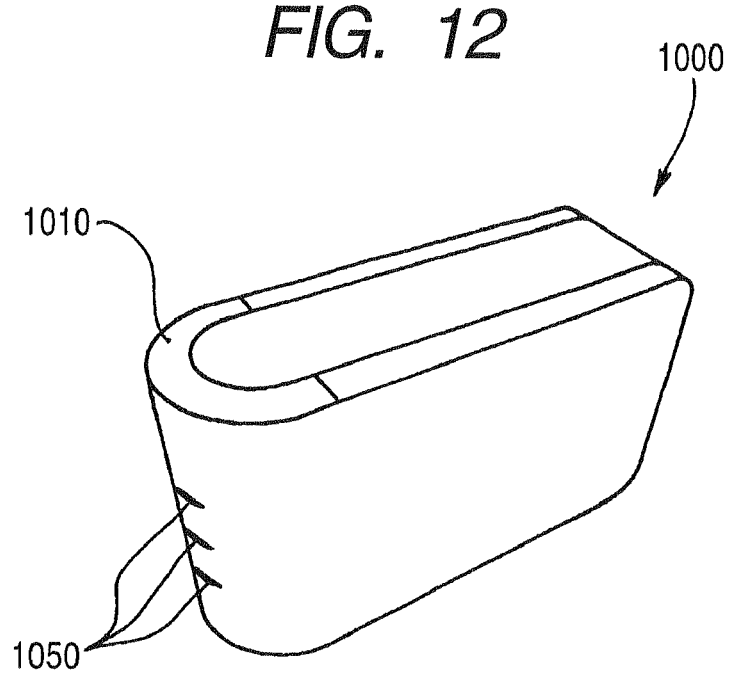
FIG. 12 is an outer perspective view illustrating a front face of a PLC modem according to the Embodiment 2.
Figure 13:
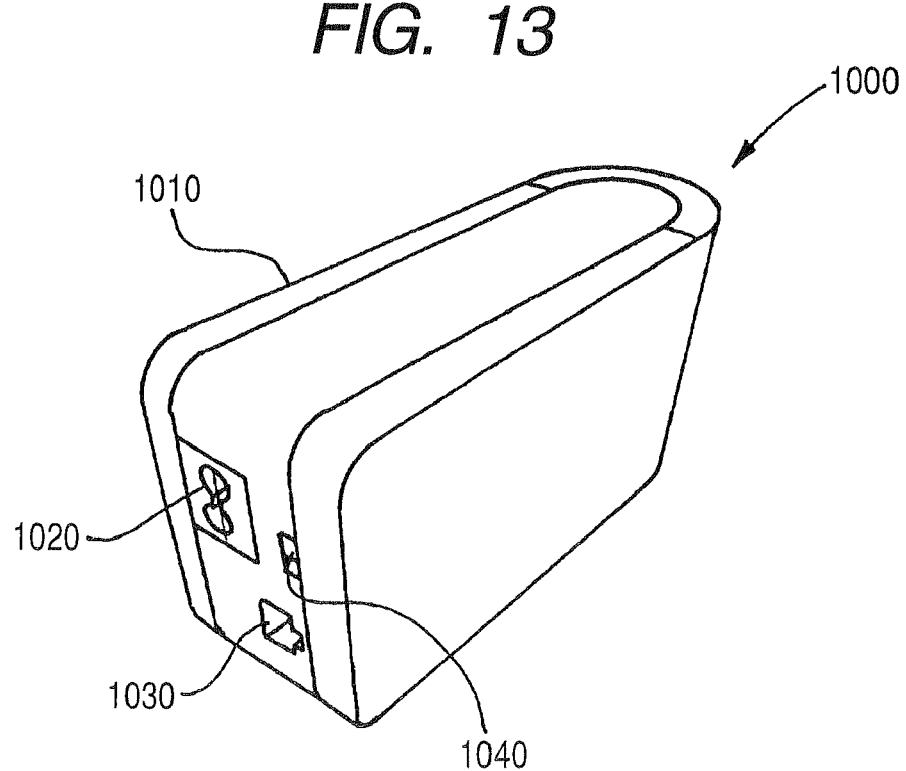
FIG. 13 is an outer perspective view illustrating a rear surface of the PLC modem according to the Embodiment 2.

As shown in FIGS. 12 and 13, a power line communication modem 1000 (hereinafter, referred to as "PLC modem 1000")

has a chassis 1010 and display units 1050 such as light emitting diodes (LED) shown in FIG. 12 are provided on the front face of the chassis 1010. In addition, as shown in FIG. 13, a power supply connector 1020, a modular jack 1030 for a local area network (LAN) such as RJ45 and a selecting switch 1040 to switch operation modes are provided on the rear surface of the chassis 1010. A power supply cable (not shown) is connected to the power supply connector 1020 and an LAN cable is connected to the modular jack 1030. In addition, since the PLC modem 1000 includes a Dsub connector as well, the Dsub cable can be connected.

Figure 14:
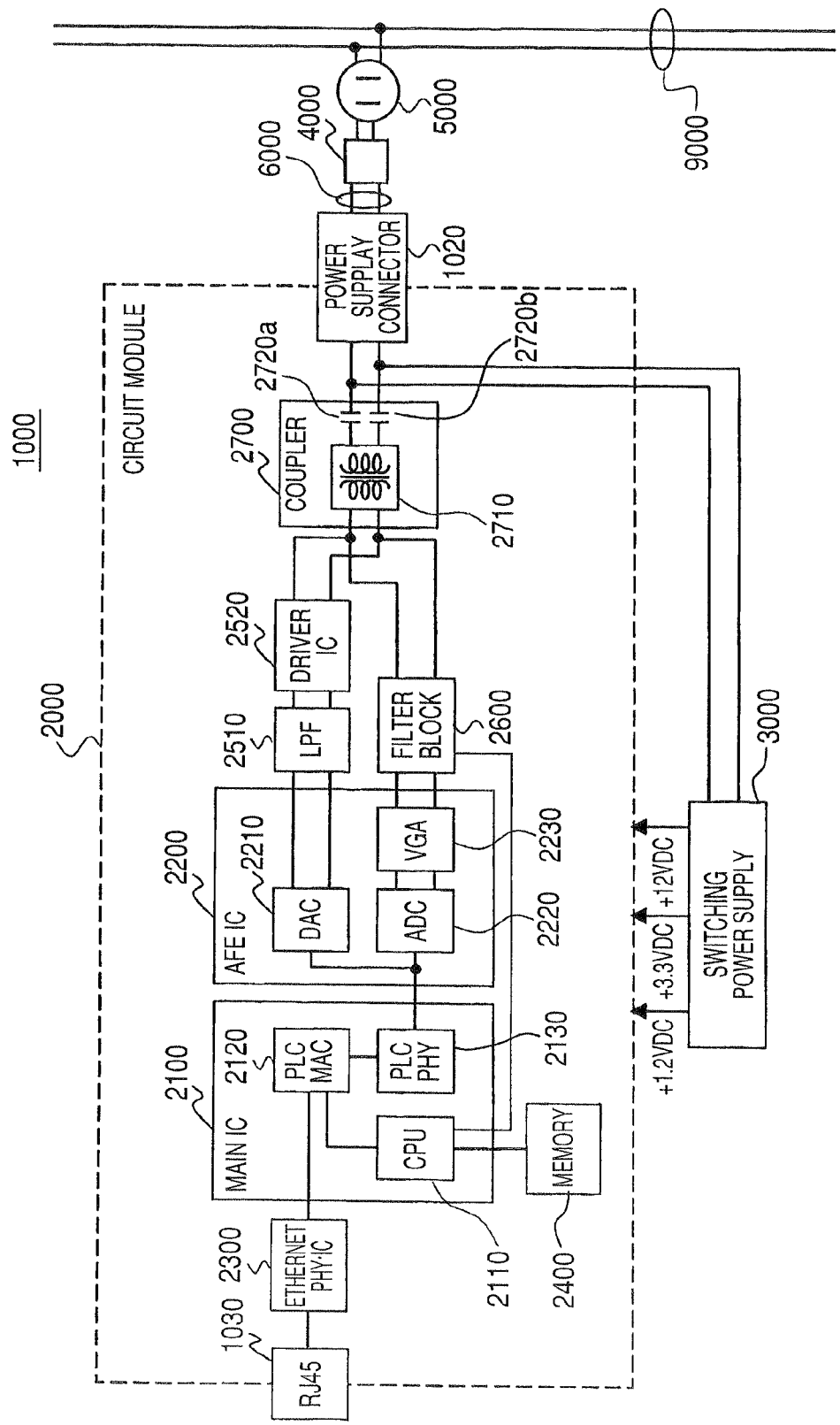
FIG. 14 is a block diagram illustrating an example of a hardware of the PLC modem according to the Embodiment 2.

The PLC modem 1000 has a circuit module 2000 and a switching power supply 3000 as shown in FIG. 14. The switching power supply 3000 supplies every kind of voltage (for example, +1.2 V, +3.3 V, and +12 V) to the circuit module 2000 and includes a switching transformer and a DC-DC converter (which all are not shown), for example.

The circuit module 2000 has a main integrated circuit (IC) 2100, an analog front end IC (AFE•IC) 2200, an Ethernet PHY•IC 2300, a memory 2400, a low-pass filter (LPF) 2510, a driver IC 2520, a filter block 2600, and a coupler 2700. The switching power supply 3000 and the coupler 2700 are connected to the power supply connector 1020 and connected to a power line 9000 via a power supply cable 6000, a power supply plug 4000, and a outlet 5000.

The main IC 2100 is constituted by a central processing unit (CPU) 2110, a power line communication media access control layer (PLC•MAC) block, and a power line communication physical layer (PLC•PHY) block 2130. The CPU 2110 includes a 32-bit reduced instruction set computer (RISC) processor. The PCL•MAC block 2120 manages the MAC layer of the transmitted and received signals and the PLC•PHY block 2130 manages the PHY layer of the transmitted and received signals. The AFE•IC 2200 is constituted by a DA converter (DAC) 2210, an AD converter (ADC) 2220, and a variable gain amplifier (VGA) 2230. Further, the CPU 2110 controls the entire the PLC modem 1000 using the data stored in the memory 2110 as well as controlling operations of the PLC•MAC block 2120 and the PLC•PHY block 2130.

The coupler 2700 is constituted by a coil transformer 2710 and capacitors 2720a and 2720b for coupling. It superposes the communication signals (transmitted signals) from the driver IC 2520 on the power line 9000 and then separates the communication signals (received signals) superposed on the power line 9000 to transmit the separated signals to the filter block 2600.

The filter block 2600 to which the communication signal separated by the coupler is inputted has a function as a band-pass filter which passes a signal of a predetermined frequency band. The filter block 2600 has a plurality of high-pass filters having mutually different cutoff frequencies, a plurality of low-pass filters having mutually different cutoff frequencies, and a selector which selects at least one high-pass filter and one low-pass filter among the plurality of high-pass filters and the plurality of low-pass filters and passes the communication signal separated by the coupler. The filter block 2600 becomes the band-pass filter depending on the state of the selector. The selector operates on the basis of the control by the CPU 2110 of the main IC 2100. The filter block 2600 will be described in detail below.

The PLC modem 1000 performs transmission by using the plurality of the sub-carriers such as the OFDM method and the digital signal process for performing such transmission is carried out by the main IC 2100, especially the PLC•PHY block 2130.

Figure 15:
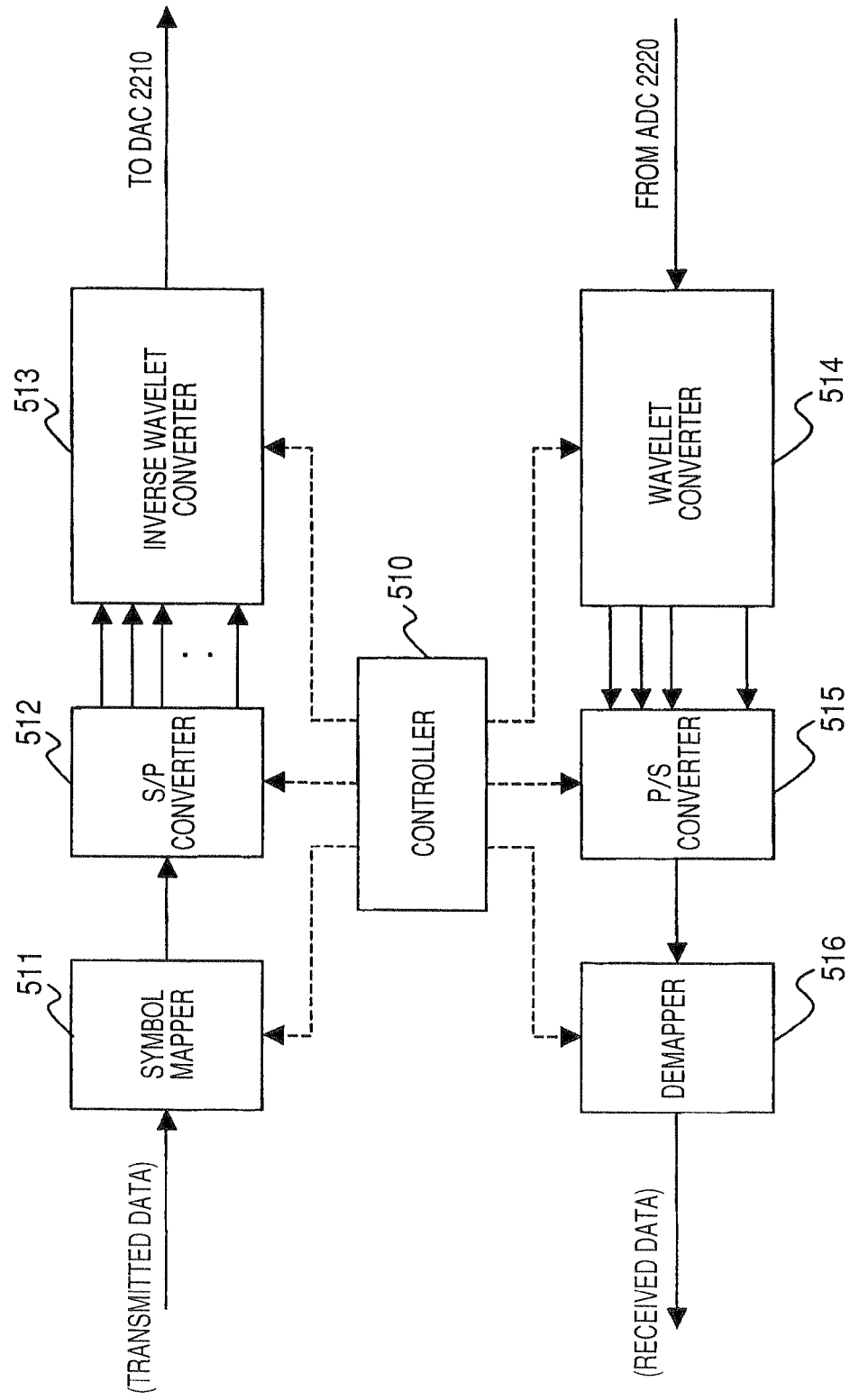
FIG. 15 is a schematic functional block diagram illustrating an example of a digital signal-processing unit realized by a main IC of the PLC modem according to the Embodiment 2.

As shown in FIG. 15, the digital signal-processing unit performs the OFDM transmission by using the wavelet transform and includes a controller 510, a symbol mapper 511, a serial-parallel converter (S/P converter) 512, an inverse wavelet converter 513, a wavelet converter 514, a parallel-serial converter (P/S conversion unit) 515, and a demapper 516.

The symbol mapper 511 performs a symbol mapping in accordance with each symbol data, converting bit data to be transmitted into the symbol data. The S/P converter 512 converters the mapped serial data into parallel data. The inverse wavelet converter 513 converts the parallel data into data on the time domain by using the inverse wavelet transform and generates a serial of sample values representing transmission symbol. The data are transmitted to the DA converter (DAC) 2210 of the AFE•IC 2200.

The wavelet converter 514 converts the received digital data (a serial of the sample values sampled at the rate which is equal at the transmitting time) obtained from the AD converter (ADC) 2220 of the AFE•IC 2200 on the frequency domain by using the discrete wavelet transform. The P/S converter 515 converts the parallel data on the frequency domain into the serial data. The demapper 516 performs decision of the received signals and then obtains the received data, calculating an amplitude value of each sub-carrier.

The communication by the PLC modem 1000 is summarized as follows. At the time of transmitting the data inputted from the modular jack 1030, the data is sent to the main IC 2100 via the Ethernet PHY•IC 2300. The digital transmission signals generated by means of the digital signal process are converted into the analog signals by the DA converter (DAC) 2210 of the AFE•IC 2200 to be outputted to the power line 9000 via the low-pass filter 2510, the driver IC 2520, the coupler 2700, the power supply connector 1020, the power supply cable 6000, the power supply plug 4000, and the outlet 5000.

At the time of receiving the signals from the power line 9000, the signals are sent to the filter block 2600 via the coupler 2700 and the gains thereof are adjusted by the variable gain amplifier (VGA) 2230 in the AFE•IC 2200. Sequentially, after the signals are converted into the digital signals by the AD converter (ADC) 2220, the digital signals are sent to the main IC 2100 and then are converted into the digital data by performing the digital signal process. Sequentially, the digital data are outputted from the modular jack 1030 via the Ethernet PHY•IC 2300.

Next, the filter block 2600 will be explained. The filter block 2600 arranges the plurality of high-pass filter having the plurality of mutually different cutoff frequencies and the plurality of low-pass filter having the plurality of mutually different cutoff frequencies in series or parallel and is connected directly or via the selecting switch so that at least one high-pass filter and at least one low-pass filter are connected in series. Hereinafter, it will be described that each of the high-pass filters (hereinafter, referred to as HPF) has cutoff frequency $f_1$ and $f_2$ respectively and each of low-pass filter (hereinafter, referred as LPF) has cutoff frequency $f_1$ and $f_3$ respectively, but more numbers of filters may be used than that shown in the drawings.

(Series Arrangement 1)

Figure 16:
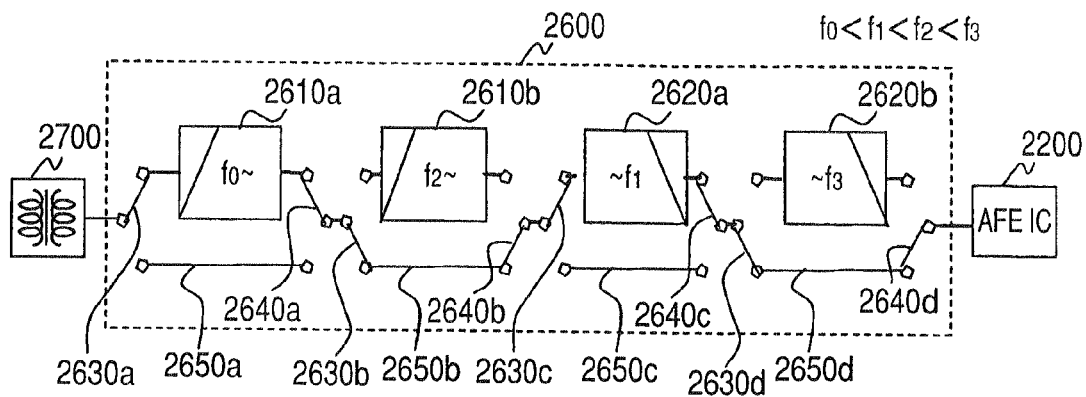
FIG. 16 is a diagram illustrating an example of a filter block in the PLC modem according to the Embodiment 2.

As shown in FIG. 16, HPF 2610a in which the cutoff frequency is $f_0$, HPF 2610b in which the cutoff frequency is $f_2$, LPF 2620a in which the cutoff frequency is $f_1$, and LPF 2620b in which the cutoff frequency is $f_3$ are connected in series in the filter block 2600 between the coupler 2700 and the AFE•IC 2200. Input switches 2630a, 2630b, 2630c, and 2630d are provided in the input portions of HPFs 2610a and 2610b and LPFs 2620a and 2620b, respectively and output switches 2640a, 2640b, 2640c, and 2640d are provided in the output portions of HPFs 2610a and 2610b and LPFs 2620a and 2620b, respectively. In addition, bypass lines 2650a, 2650b, 2650c, and 2650d corresponding to HPFs 2610a and 2610b, and LPFs 2620a and 2620b are provided to be switched by the input switches 2630a to 2630d and the output switches 2640a to 2640d so as to be connected.

Consequently, by switching and coupling the input switch 2630a and the output switch 2640a, the input switch 2630b and the output switch 2640b, the input switch 2630c and the output switch 2640c, and the input switch 2630d and the output switch 2640d, HPFs 2610a and 2610b, and LPF 2620a and 2620b can be selectively connected between the coupler 2700 and the AFE•IC 2200. When the input switches 2630a to 2630d and the output switches 2640a to 2640d are at the state shown in FIG. 16, HPFs 2610a and 2610b are connected in series HPFs 2610a and 2610b are realized by the circuit shown in FIG. 17, for example. In a circuit shown in FIG. 17, by using an electrical capacity element C of which electrical capacity is in the range of 10 to 1000 pF and an inductor L of which inductance is in the range of 0.1 to 10 µH, the high-pass filter of which the cutoff frequency 2 to 20 MHz can be realized, for example. In addition, LPF 2620a and LPF 2620b are realized by the circuit shown in FIG. 18, for example. In a circuit shown in FIG. 18, by using an electrical capacity element C of which electrical capacity is in the range of 10 to 100 pF and an inductor L of which inductance is in the range of 0.1 to 10 µH, the low-pass filter of which the cutoff frequency 3 to 30 MHz can be realized, for example. Further, an order of the cutoff frequencies $f_0$, $f_1$, $f_2$, and $f_3$ is $f_0 < f_1$, $< f_2 < f_3$.

Figure 19A:
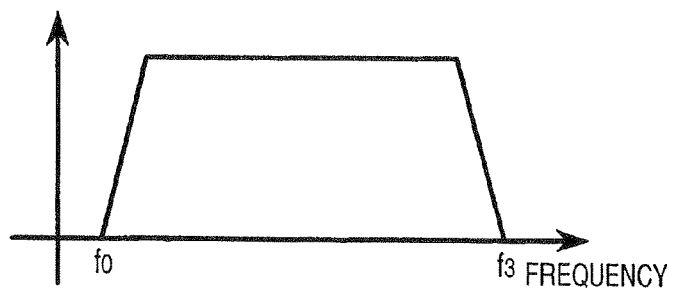
FIGS. 19(*a*), 19(*b*) and 19(*c*) are diagrams illustrating band pass characteristics realized by the filter block in the PLC modem according to the Embodiment 2.
Figure 19B:
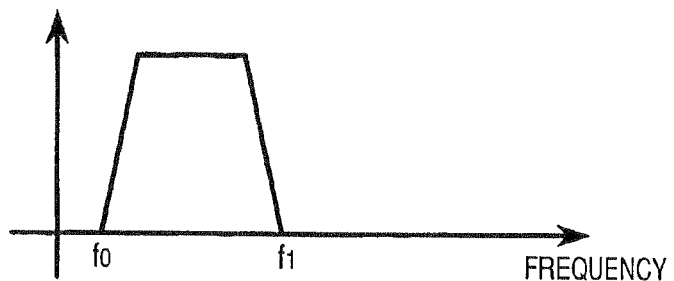
Figure 19C:
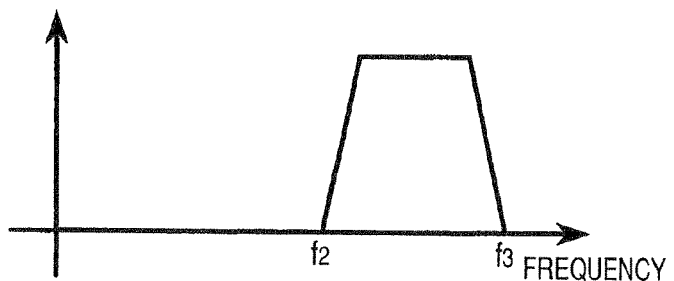

The filter block 2600 shown in FIG. 16 can realize 3 kinds of band pass characteristics as shown in FIGS. 19A to 19C. As shown in FIG. 19A, HPF 2610a and LPF 2620b are connected in series between the coupler 2700 and the AFE•IC 2200 so as to bypass HPF 2610b and LPF 2620a in the case that the frequency domains $f_0$ to $f_3$ are passed. As shown in FIG. 19B, HPF 2610a and LPF 2620a are connected in series between the coupler 2700 and the AFE•IC 2200 so as to bypass HPF 2610b and LPF 2620b in the case that the frequency domains $f_0$ to $f_1$ are passed. In addition, as shown in FIG. 19C, HPF 2610b and LPF 2620b are connected in series between the coupler 2700 and the AFE•IC 2200 so as to bypass HPF 2610a and LPF 2620a in the case that the frequency domains $f_2$ to $f_3$ are passed. In this manner, since HPF 2610a and LPF 2620b are shared in the case that they are configured as the plurality of band-pass filters, HPF and LPF can decrease in number to configure the band-pass filters. That is, even though only one of HPF and only one of LPF are provided in the every cutoff frequency, the plurality of band pass filters can be configured. Accordingly, the filters can decrease in number on the whole.

In addition, HPFs 2610a and HPF 2610b, and LPFs 2620a and LPF 2620b are arranged sequentially from the coupler 2700 shown in FIG. 16, but the order of HPF and LPF can be arranged otherwise.

(Series Arrangement 2)

Figure 20:
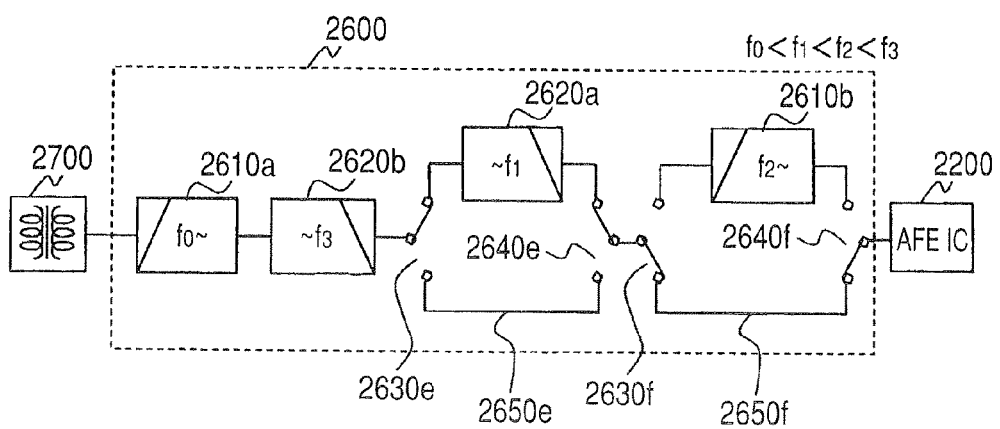
FIG. 20 is a diagram illustrating another example of the filter block in the PLC modem according to the Embodiment 2.

Another example of the filter block 2600 is illustrated in FIG. 20. HPF 2610a in which the cutoff frequency is $f_0$, HPF 2610b in which the cutoff frequency is $f_2$, LPF 2620a in which the cutoff frequency is $f_1$, and LPF 2620b in which the cutoff frequency is $f_3$ are connected in series in the filter block 2600 between the coupler 2700 and the AFE•IC 2200 shown in FIG. 20 like those in FIG. 16. A different point from the configuration shown in FIG. 16 is that HPF 2610a which is HPF having the lowest cutoff frequency and LPF 2620b which is LPF having the highest cutoff frequency are connected between the coupler 2700 and the AFE•IC 2200, and HPF 2610b and LPF 2620a are selectively connected. Consequently, the input switches 2630e and 2620f are provided in the input portions of HPF 2610b and LPF 2620a and the output switches 2640e and 2640f are provided in the output portions thereof. In addition, the bypass lines 2650e and 2650f corresponding to HPF 2630e and LPF 2620a are provided to be switched by the input switches 2630e and 2630f and the output switches 2640e and 2640f so as to be connected. Consequently, the input switch 2630e and the output switch 2640e, and the input switch 2630f and the output switch 2640f are coupled and switched like those in FIG. 5.

Figure 17:
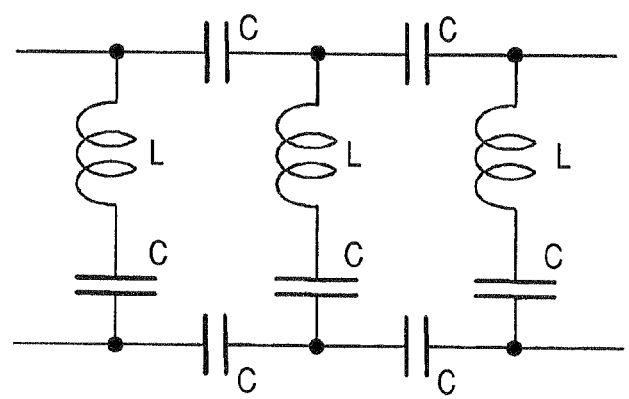
FIG. 17 is a diagram illustrating a configuration example of a high-pass filter configuring the filter block in the PLC modem according to the Embodiment 2.
Figure 18:
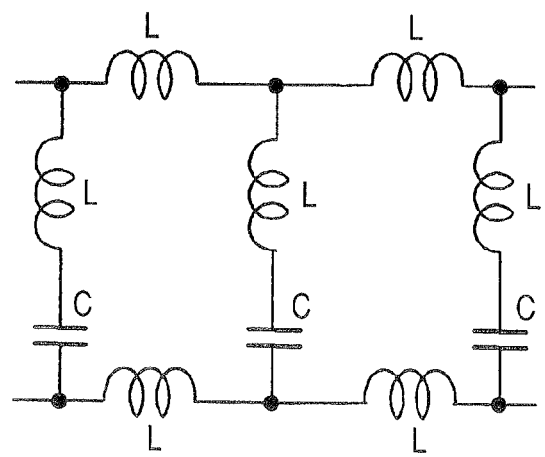
FIG. 18 is a diagram illustrating a configuration example of a low-pass filter configuring the filter block in the PLC modem according to the Embodiment 2.

HPFs 2610a and 2610b and LPFs 2620a and 2620b in the filter block 2600 shown in FIG. 20 can be realized by using the circuits shown in FIGS. 17 and 18. The 3 kinds of the band pass characteristics represented in FIGS. 19A to 19C can be realized in the filter block 2600 shown in FIG. 20 like that in FIG. 16. When the characteristic represented in FIG. 19A is obtained, HPF 2610a and LPF 2620a are made bypassed. When the characteristic represented in FIG. 19B is obtained, HPF 2610b is made bypassed, connecting LPF 2620a in series between the coupler 2700 and the AFE•IC 2200. In this case, LPF 2620b is connected in series as well, but since the cutoff frequency $f_3$ of LPF 2620b is higher than the cutoff frequency $f_1$ of LPF 2620a there is no problem. In addition, when the characteristic represented in FIG. 19C is obtained, LPF 2620a is made bypassed, connecting HPF 2610b in series between the coupler 2700 and the AFE•IC 2200. In this case, HPF 2610a is connected in series as well, but since the cutoff frequency $f_0$ of HPF 2610a is lower than the cutoff frequency $f_2$ of HPF 2610b, there is no problem.

In this manner, since the more broadband HPF 2610a and LPF 2620b are in the connected state in the filter block shown in FIG. 20, the switches for switching the pass band can decrease in number. Accordingly, PLC can decrease more in size.

In addition, HPF 2610a, LPF 2620b, LPF 2620a, and HPF 2610b are arranged sequentially from the coupler 2700 shown in FIG. 20, but the order of HPF and LPF can be arranged otherwise.

(Parallel Arrangement)

Figure 21:
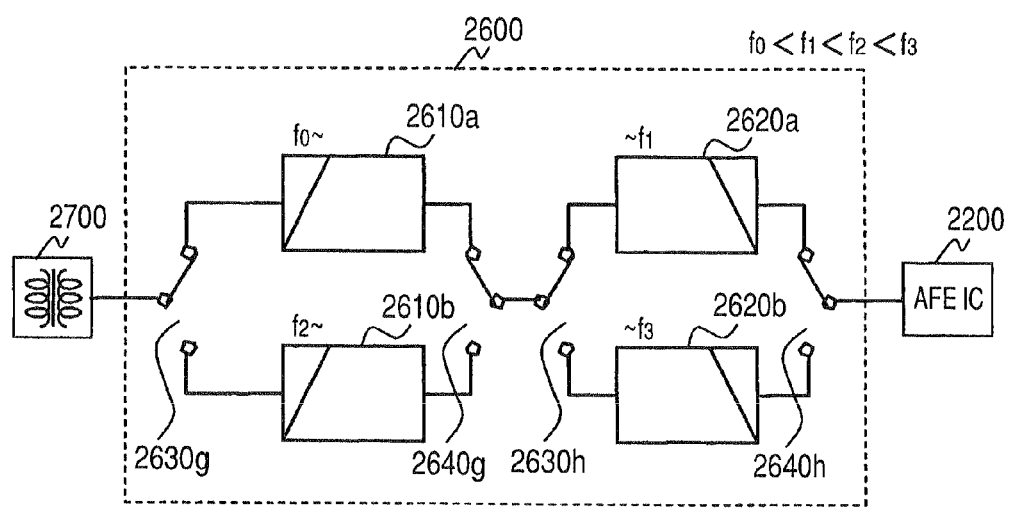
FIG. 21 is a diagram illustrating other example of the filter block in the PLC modem according to the Embodiment 2.

Other example of the filter block 2600 is illustrated in FIG. 21. HPFs 2610a and 2610b, and LPFs 2620a and 2620b are arranged in parallel, respectively in the filter block 2600 shown in FIG. 21 so as to select one HPF and one LPF. The input switch 2630g is provided in the input portion of HPFs 2610a and 2610b and the output switch 2640g is provided in the output portion thereof. In addition, the input switch 2630h is provided in the input portion of LPFs 2620a and 2620b and the output switch 2640h is provided in the output portion thereof.

By coupling and switching the input switch 2630g and the output switch 2640g, and the input switch 2630h and the output switch 2640h in the filter block 2600 shown in FIG. 21, any one of HPFs 2610a and 2610b and any one of LPFs 2620a and 2620b are connected in series between the coupler 2700 and the AFE•IC 2200.

HPFs 2610a and 2610b and LPFs 2620a and 2620b in the filter block 2600 shown in FIG. 21 can be realized by using the circuits shown in FIGS. 17 and 18. The 3 kinds of the band pass characteristics represented in FIGS. 19A to 19C can be realized in the filter block 2600 shown in FIG. 21. When the characteristic represented in FIG. 19A is obtained, the input switch 2630g and the output switch 2640g are connected to HPF 2610a and the input switch 2630h and the output switch 2640h are connected to LPF 2620b. When the characteristic represented in FIG. 19B is obtained, the input switch 2630h and the output switch 2640g are connected to HPF 2610a and the input switch 2630g and the output switch 2640g are connected to LPF 2620a. In addition, when the characteristic represented in FIG. 19C is obtained, the input switch 2630g and the output switch 2640g are connected to HPF 2610b and the input switch 2630h and the output switch 2640h are connected to LPF 2620b.

As described above, the filter block 2600 shown in FIG. 21 selects one HPF from the plurality of HPFs and one LPF from the plurality of LPFs. Accordingly, HPF and LPF required to obtain the pass band can be selected by using the small number of the switches.

In addition, HPFs 2610a and 2610b are arranged in the side of the coupler 2700 and LPFs 2620a and 2620b are arranged in the side of the AFE•IC 2200, but the order of HPFs and LPFs can be arranged otherwise.

(Series and Parallel Arrangement 1)

Figure 22:
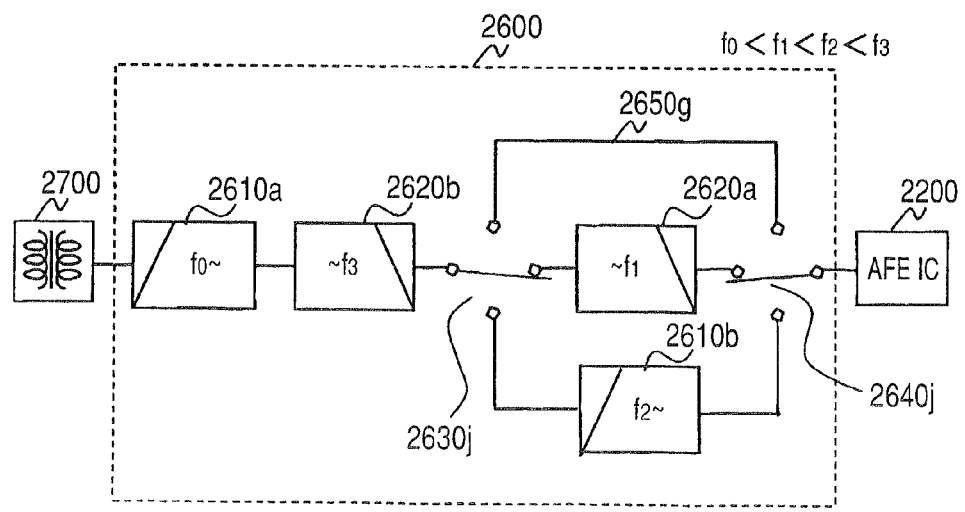
FIG. 22 is a diagram illustrating other example of the filter block in the PLC modem according to the Embodiment 2.

Other example of the filter block 2600 is illustrated in FIG. 22. The filter block in FIG. 20 is modified into the filter block 2600 in FIG. 22 so that the switches decrease in number. HPF 2610a which is HPF having the lowest cutoff frequency and LPF 2620b which is LPF having the highest cutoff frequency are connected between the coupler 2700 and the AFE•IC 2200, and HPF 2610b and LPF 2620a are selectively connected in the filter block 2600 shown in FIG. 22 like that shown in FIG. 20. A different point from that shown in FIG. 20 is that HPF 2610b and LPF 2620a are arranged in parallel and are selectively connected, by coupling to operate the input switch 2630j and the output switch 2640j. In addition, the input switch 2630j and the output switch 2640j are switched to be also connected to a bypass line 2650g, and when they are connected to the bypass line 2650g, only HPF 2610a and LPF 2620b are connected between the coupler 2700 and the AFE•IC 2200.

HPFs 2610a and 2610b and LPFs 2620a and 2620b in the filter block 2600 shown in FIG. 22 can be realized by using the circuits shown in FIGS. 17 and 18. The 3 kinds of the band pass characteristics represented in FIGS. 19A to 19C can be realized in the filter block 2600 shown in FIG. 22 like that in FIG. 22. When the characteristic represented in FIG. 19A is obtained, the input switch 2630j and the output switch 2640j are connected to the bypass line 2650g. When the characteristic represented in FIG. 19B is obtained, the input switch 2630j and the output switch 2640j are connected to LPF 2620a. In addition, when the characteristic represented in FIG. 19C is obtained, the input switch 2630j and the output switch 2640j are connected to HPF 2610b.

In this manner, since the more broadband HPF 2610a and LPF 2620b are in the connected state, and one of the remaining HPF and LPF is selected or HPF and LPF are bypassed in the filter block shown in FIG. 22, the switches for switching the pass band can decrease more in number.

(Series and Parallel Arrangement 2)

Figure 23:
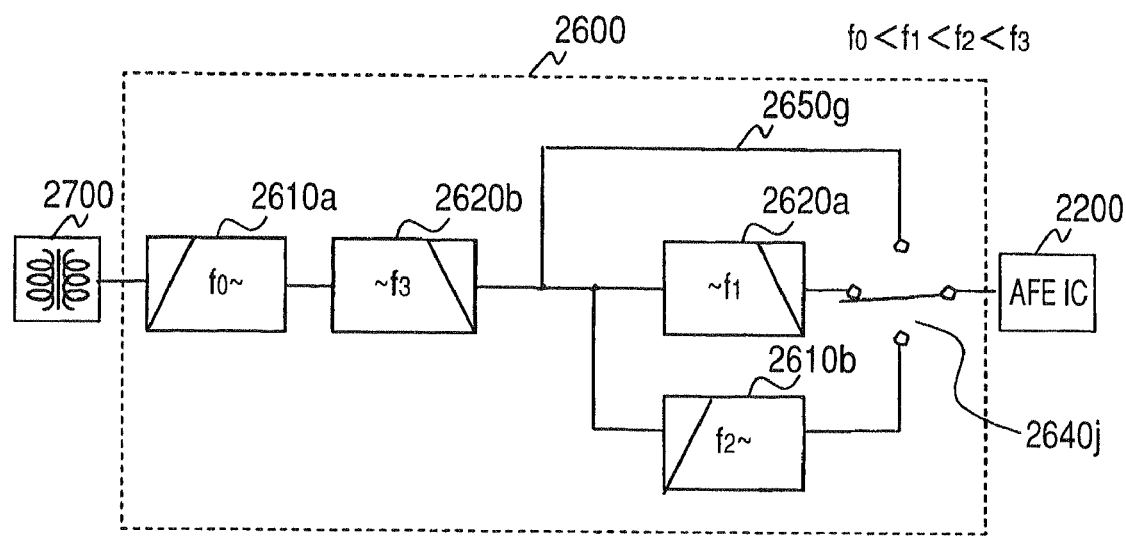
FIG. 23 is a diagram illustrating other example of the filter block in the PLC modem according to the Embodiment 2.

Other example of the filter block 2600 is illustrated in FIG. 23. The filter block in FIG. 22 is modified into the filter block 2600 in FIG. 23 so that the switches decrease more in number. HPF 2610a which is HPF having the lowest cutoff frequency and LPF 2620b which is LPF having the highest cutoff frequency are connected between the coupler 2700 and the AFE•IC 2200, and HPF 2610b and LPF 2620a are selectively connected in the filter block 2600 shown in FIG. 23 like that shown in FIG. 22. The different point from that shown in FIG. 22 is that HPF 2610b, LPF 2620a, and the bypass line 2650g are directly connected to the output of LPF 2620b by removing the input switch 2630j.

The 3 kinds of the band pass characteristics represented in FIGS. 19A to 19C can be realized in the filter block 2600 shown in FIG. 23 like that in FIG. 22. That is, when the output switch 2640j is connected to the bypass line 2650g, the frequency band becomes $f_0$ to $f_3$ (see FIG. 19A), and when the output switch 2640j is connected to LPF 2620a, the frequency band becomes $f_0$ to $f_1$ (see FIG. 19B). In addition, when the output switch 2640j is connected to HPF 2610b, the frequency band becomes $f_2$ to $f_3$ (see FIG. 19C).

HPF 2610a and LPF 2620b are sequentially arranged in the side of the coupler 2700 as shown in FIG. 23, but HPF 2610a and LPF 2620b can be conversely arranged.

HPFs 2610a and 2610b and LPFs 2620a and 2620b in the filter block 2600 shown in FIG. 23 can be realized by using the circuits shown in FIGS. 17 and 18. However, HPF 2610b and LPF 2620a are configured as a diplexer. When they are configured as the diplexer, the circuit configuration is equal to the circuits shown in FIGS. 17 and 18, but the electrical capacity and inductance are different. That is, by using an electrical capacity element of which the electrical capacity is in the range of 33 to 150 pF and an inductor L of which the inductance is in the range of 0.56 to 5.6 µH, the diplexer having the same cutoff frequency can be realized in the circuit shown in FIG. 17. In addition, by using the electrical capacity element of which the electrical capacity is in the range of 33 to 150 pF and the inductor L of which the inductance is in the range of 0.56 to 5.6 µH, the diplexer having the same cutoff frequency can be realized in the circuit shown in FIG. 18. By configuring HPF 2610b and LPF 2620a as the diplexer, the input switch of HPF 2610b and LPF 2620a can be removed.

As described above, at least one high-pass filter and one low-pass filter are selected among the plurality of high-pass filter and the plurality of low-pass filter in the filter blocks shown in FIG. 16 and FIGS. 20 to 23, and the selector which passes the communication signals separated by the coupler is configured including the input switches 2630a to 2630j and the output switches 2640a to 2640j. Such input switches 2630a to 2630j and the output switches 2640a to 2640j are switched by the signals coming from CPU 2110.

The power line communication apparatus 1000 having such a filter block 2600, for example, can perform access communication in the frequency band $f_0$ to $f_1$ and premise communication in the frequency band $f_2$ to $f_3$. Here, the access communication means a communication method of using the outdoor power line and the premise communication means a communication method of using indoor power line. Further, it is possible to perform the premise communication in the frequency band $f_0$ to $f_1$ and the access communication in the frequency band $f_2$ to $f_3$ as well.

In addition, the modem used in the power line communication apparatus is exemplified in the above-description, but a unit capable of performing communication in every kind of electronic apparatus can decrease in number as well by using the same filter block.

In addition, the Embodiments 1 and 2 can be combined. In this case, specifically, the frequency carrier detecting unit 10 shown in FIG. 6 and the PLC•PHY block 2130 shown in FIG. 14 can be provided.

The invention is useful in a multi-carrier communication apparatus and the like capable of decreasing omission of a carrier detection even when a plurality of communication apparatuses simultaneously transmit signals at the state of time discord.

This application is based upon and claims the benefit of priority of Japanese Patent Application No. 2006-101777 filed on Apr. 3, 2006 and No. 2006-199596 filed on Jul. 21, 2006, the contents of which are incorporated herein by reference in its entirety.

Figure 24:
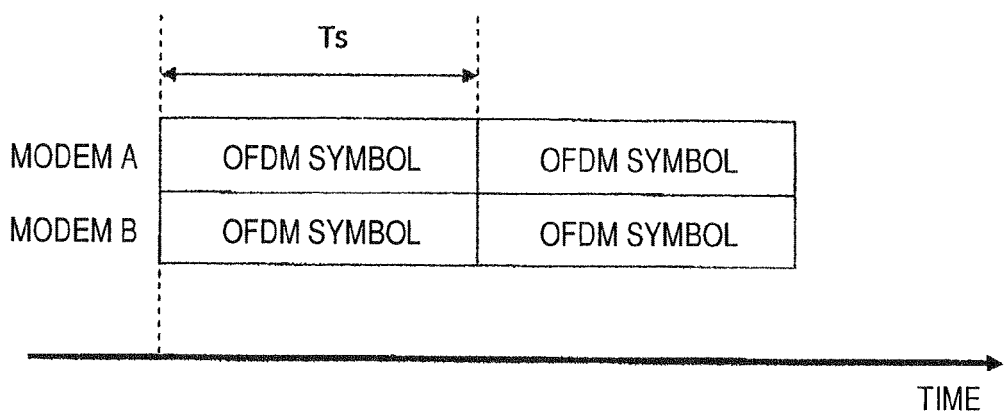
FIG. 24 is a conceptual diagram of a symbol when two communication apparatuses simultaneously transmit the signals on the transmission line without time discord.
Figure 25:
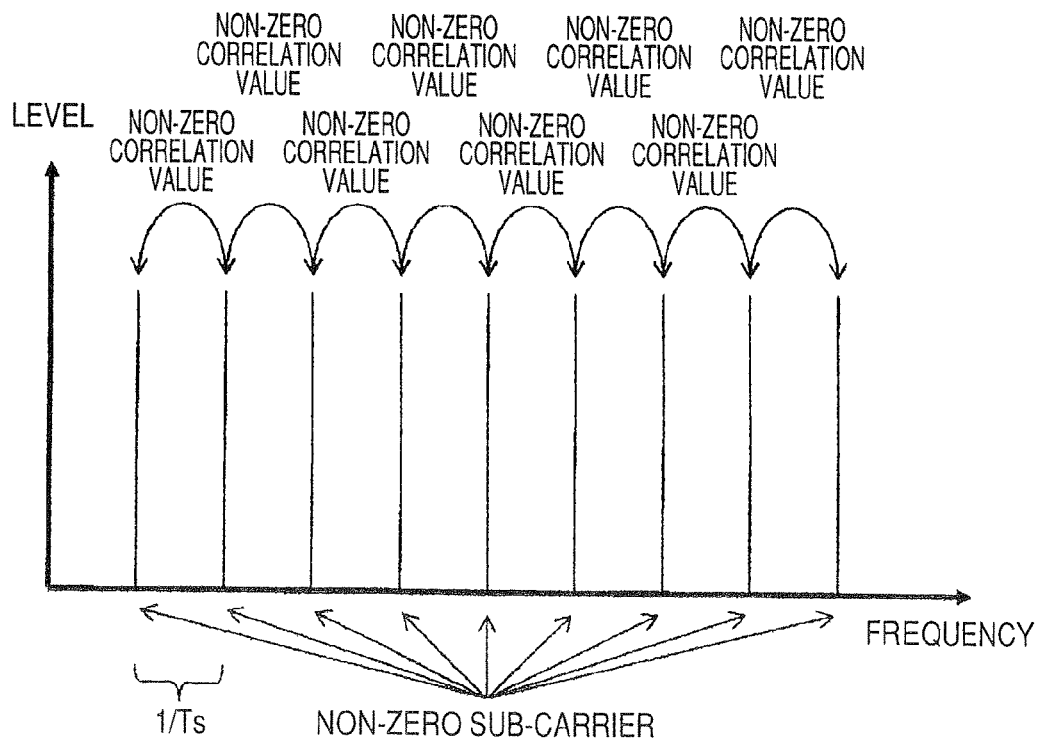
FIG. 25 is a diagram representing a frequency spectrum when two communication apparatuses simultaneously transmit signals on a transmission line without time discord.
Figure 26:
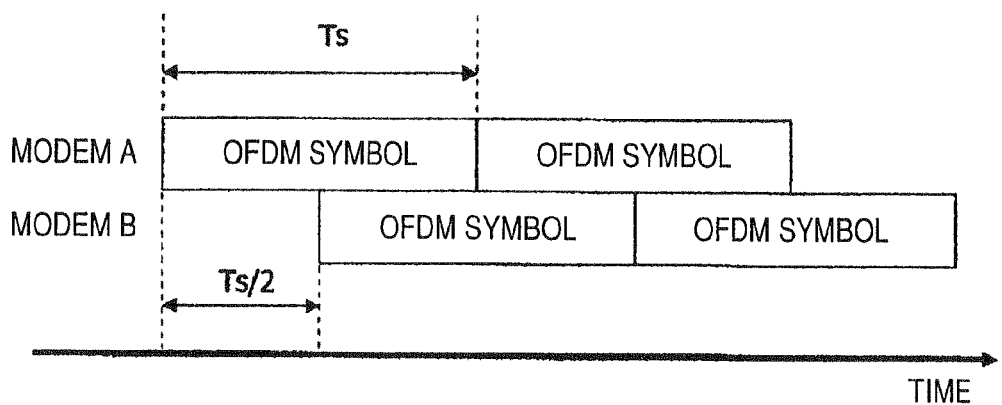
FIG. 26 is a conceptual diagram of a symbol when two communication apparatuses simultaneously transmit the signals on the transmission line at the state of time discord.
Figure 27:
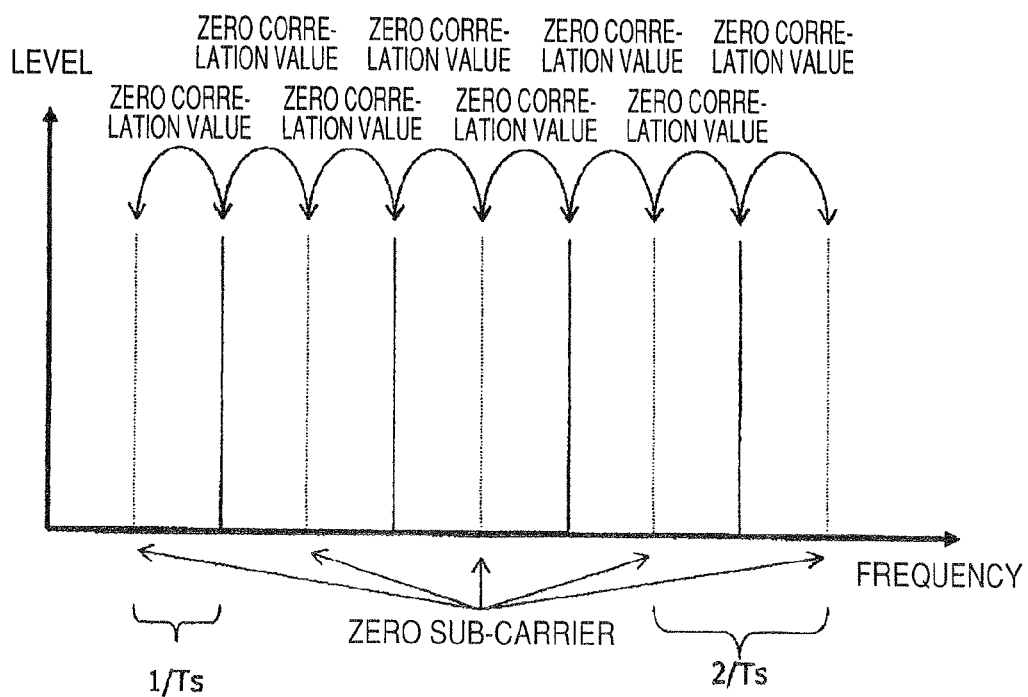
FIG. 27 is a diagram representing a frequency spectrum when two communication apparatuses simultaneously transmit the signals on the transmission line at the state of time discord.

[Selected Drawing] FIG. 1
[Designation of Document] Drawings
[FIG. 1]
→ TRANSMITTED DATA
ƒRECEIVED DATA
10: FREQUENCY CARRIER DETECTION UNIT
11: CONTROLLER
1: DIGITAL SIGNAL-PROCESSING UNIT
21: TRANSMITTING DA
21B: RECEIVING AD
22: TRANSMITTING FILTER
24: TRANSMITTING SWITCH
25: RECEIVING FILTER
2: ANALOG CIRCUIT UNIT
[FIG. 2]
→ TRANSMITTED DATA
← RECEIVED DATA
14: SYMBOL MAPPER
15: S/P CONVERTER
16: INVERSE FOURIER CONVERTER
11: CONTROLLER
10: FREQUENCY CARRIER DETECTOR
19: DEMAPPER
18: P/S CONVERSION UNIT
17: FOURIER CONVERTER
→ TO TRANSMITTING DA21$a$
← FROM RECEIVING AD21$b$
[FIG. 5]
212: EHTERNET PHY•IC
201 (1): MAIN IC
211: MEMORY 203: DRIVER IC
206: COUPLER
200: CIRCUIT MODULE
102: POWER SUPPLY CONNECTOR
300: SWITCHING POWER SUPPLY
[FIG. 6]
FROM FOURIER CONVERTER 17
110: P/S CONVERSION UNIT
111: PHASE DIFFERENCE CALCULATOR
112: PHASE DIFFERENCE DISTRIBUTION GENERATION UNIT
113: COMPARISON AND DETERMINATION UNIT
→ TO CONTROLLER 11
[FIG. 7]
CASE THAT THERE IS NO TIME DISCORD BETWEEN TWO COMMUNICATION APPARATUSES
LEVEL
FREQUENCY
NON-ZERO CORRELATION VALUE
[FIG. 8]
CASE THAT THERE IS TIME DISCORD BETWEEN TWO COMMUNICATION APPARATUSES (FOR EXAMPLE, $T_s/2$)
LEVEL
FREQUENCY
CORRELATION VALUE 0
NON-ZERO CORRELATION VALUE
[FIG. 9]
STEP S11, s(t)=RECEIVED WAVEFORM
STEP S12, F=FFT [s(t)]
STEP S13, CARRIER DETECTION
STEP S14, crrdet=1?
s(t): RECEIVED WAVEFORM DATA
F: FREQUENCY DATA (SUB-CARRIER DATA) AFTER FFT
N: OFDM SYMBOL PERIOD (FFT SAMPLE NUMBER)
icc: CORRELATION VALUE
A, B, C, D, E: DISTRIBUTION INFORMATION
M: TOTAL CORRELATION NUMBER BETWEEN CARRIERS
m: DISTRIBUTION INFORMATION (MAXIMUM VALUE)
Th: THRESHOLD
Crredet: CARRIER DETECTION SIGNAL
[FIG. 10]
CARRIER DETECTOR
STEP S131
STEP S132
STEP S133
STEP S134
STEP S135
STEP S136
STEP S137, m=MAX {[A, B, C, D]}
th=(M−E)×THRESHOLD TIMES
STEP S131
STEP S131
[FIG. 11]
PR: PREAMBLE
SW: SYNCHRONIZATION WORD
INFORMATION (PAYLOAD)
[FIG. 14]
2300: ETHERNET PHY•IC
2100: MAIN IC
2400: MEMORY
2000: CIRCUIT MODULE
2520: DRIVER IC
2600: FILTER BLOCK
2700: COUPLER
1020: POWER SUPPLY CONNECTOR
3000: SWITCHING POWER SUPPLY
[FIG. 15]
(TRANSMITTED DATA)
511: SYMBOL MAPPER
512: S/P CONVERTER
513: INVERSE WAVELET CONVERTER
510: CONTROLLER
(RECEIVED DATA)
516: DEMAPPER
515: P/S CONVERTER
514: WAVELET CONVERTER
→ TO DAC 2210
← FROM ADC 2220
[FIG. 19]
FREQUENCY
[FIG. 24]
MODEM A
MODEM B
OFDM SYMBOL
TIME
[FIG. 25]
LEVEL
NON-ZERO CORRELATON VALUE
NON-ZERO SUB-CARRIER
FREQUENCY
[FIG. 26]
MODEM A
MODEM B
OFDM SYMBOL
TIME
[FIG. 27]
LEVEL

ZERO CORRELATION VALUE
ZERO SUB-CARRIER
FREQUENCY

What is claimed is:

1. A multi-carrier communication apparatus which receives a multi-carrier signal from one multi-carrier communication apparatuses via a transmission line, the multi-carrier communication apparatus comprising:
   a complex signal-transformer which transforms a time-domain signal received via the transmission line into at least three complex signals, each of the three complex signals corresponding to frequency different from each other;
   a phase difference-calculator which calculates a phase difference between a pair of the complex signals among the at least three complex signals, the pair of the complex signals being not adjacent to each other in a frequency domain; and
   a multi-carrier signal-determining unit which determines, on the basis of the phase difference, whether the time-domain signal is the multi-carrier signal, wherein the transmission line is a power line.

2. The multi-carrier communication apparatus according to claim 1, further comprising a phase difference distribution-generator which generates distribution of the phase difference on the complex coordinates, wherein the phase difference-calculator calculates a plurality of phase differences; the phase difference distribution-generator generates the distribution of the plurality of phase differences; and the multi-carrier signal-determining unit determines, on the basis of the distribution of the plurality of phase differences, whether the time-domain signal is the multi-carrier signal.

3. The multi-carrier communication apparatus according to claim 1, wherein the phase difference-calculator calculates the phase difference between the pair of the complex signals, the pair of the complex signals being adjacent to each other at one interval.

4. The multi-carrier communication apparatus according to claim 1, wherein the multi-carrier signal is a frame including a preamble and a synchronization word.

5. The multi-carrier communication apparatus according to claim 4, wherein at least one of the preamble and the synchronization word has a predetermined constant value on the frequency domain.

6. The multi-carrier communication apparatus according to claim 1, wherein the multi-carrier signal has a predetermined constant value on the frequency domain.

7. The multi-carrier communication apparatus according to claim 1, further comprising: a coupler separating a communication signal from an alternating voltage of the power line; a filter block which is connected to the coupler and to which the communication signal separated by the coupler is inputted; and an AD converter connected to the filter block and converting the communication signal passed through the filter block into a digital signal, wherein the filter block includes a plurality of high-pass filters having mutually different cutoff frequencies, a plurality of low-pass filters having mutually different cutoff frequencies, and a selector selecting at least one high-pass filter and at least one low-pass filter from the plurality of high-pass and low-pass filters so that the communication signal separated by the coupler passes through the selected filters.

8. The multi-carrier communication apparatus according to claim 7, wherein the selector includes input switches selectively connecting to each input terminal of the plurality of high-pass filters and the plurality of low-pass filters; output switches selectively connecting to each output terminal of the plurality of high-pass filters and the plurality of low-pass filters; and bypass lines being selectively connected to the input switches and the output switches and bypassing each of the plurality of high-pass filters and the plurality of low-pass filters, wherein the plurality of high-pass filters and the plurality of low-pass filters are selectively connected in series through the input switches and the output switches between the coupler and the AD converter.

9. The multi-carrier communication apparatus according to claim 7, wherein the selector has input switches selectively connected to each input terminal of the high-pass filters excluding the high-pass filter with the lowest cutoff frequency among the plurality of high-pass filters and the low-pass filters excluding the low-pass filter with the highest cutoff frequency; output switches selectively connected to each output terminals of the high-pass filters excluding the high-pass filter with the lowest cutoff frequency among the plurality of high-pass filters and the low-pass filters excluding the low-pass filter with the highest cutoff frequency; and bypass lines for bypassing each of the high-pass filters excluding the high-pass filter with the lowest cutoff frequency among the plurality of high-pass filters and the low-pass filters excluding the low-pass filter with the highest cutoff frequency among the plurality of low-pass filters when the input switches and the output switches are selectively connected, wherein the high-pass filter with the lowest cutoff frequency among the plurality of the high-pass filters and the low-pass filter with the highest cutoff frequency among the plurality of low-pass filters are directly connected between the coupler and the AD converter in series; and the high-pass filter excluding the high-pass filter with the lowest cutoff frequency among the plurality of high-pass filters and the low-pass filter excluding the high-pass filter with the highest cutoff frequency among the plurality of low-pass filters are selectively connected via the input switches and the output switches between the coupler and the AD converter in series.

10. The multi-carrier communication apparatus according to claim 7, wherein the selector has input switches of the high-pass filter selectively connected to input terminals of the plurality of high-pass filters; output switches of the high-pass filter selectively connected to input terminals of the plurality of high-pass filters; input switches of the low-pass filter selectively connected to input terminals of the plurality of low-pass filters; and output switches of the low-pass filter selectively connected to input terminals of the plurality of low-pass filters, wherein any one of the plurality of high-pass filters and any one of the plurality of low-pass filters are connected via the input switches and the output switches between the coupler and the AD converter in series.

11. The multi-carrier communication apparatus according to claim 7, wherein the selector has input switches selectively connected to input terminals of the high-pass filters excluding the high-pass filter with the lowest cutoff frequency among the plurality of high-pass filters, input terminals of the low-pass filters excluding the low-pass filter with the highest cutoff frequency among the plurality of low-pass filters, and bypass lines; and output switches selectively connected to output terminals of the high-pass filters excluding the high-pass filter with the lowest cutoff frequency among the plurality of high-pass filters, output terminals of the low-pass filters excluding the low-pass filter with the highest cutoff frequency among the plurality of low-pass filters, and the bypass lines, wherein the high-pass filter with the lowest cutoff frequency among the plurality of high-pass filters and the low-pass filter with the highest cutoff frequency among the plurality of low-pass filters are directly connected between the coupler and the AD converter; and the high-pass filter excluding the high-pass filter with the lowest cutoff frequency among the plurality of high-pass filters and the low-pass filter excluding the low-pass filter with the highest cutoff frequency among the plurality of low-pass filters are selectively connected via the input switches and the output switches between the coupler and the AD converter in series.

12. The multi-carrier communication apparatus according to claim 7, wherein the selector has output terminals of the high-pass filters excluding the high-pass filter with the lowest cutoff frequency among the plurality of high-pass filters; output terminals of the low-pass filters excluding the low-pass filter with the highest cutoff frequency among the plurality of low-pass filters; and output switches selectively connected to bypass lines, wherein the high-pass filter with the lowest cutoff frequency among the plurality of high-pass filters and the low-pass filter with the highest cutoff frequency among the plurality of low-pass filters are connected to the coupler in series and are connected to the input terminals of the high-pass filters excluding the high-pass filter with the lowest cutoff frequency among the plurality of the high-pass filters, input terminals of the low-pass filters excluding the low-pass filter with the highest cutoff frequency among the plurality of the low-pass filters, and the bypass lines; and the output switches are connected to the AD converter.

13. A multi-carrier communication apparatus which receives a multi-carrier signal from a multi-carrier communication device via a transmission line, the multi-carrier communication apparatus comprising:
   a complex signal-transformer which transforms a time domain signal received via the transmission line into a first complex signal corresponding to a first frequency, a second complex signal corresponding to a second frequency, and a third complex signal corresponding to a third complex signal, where the third frequency is higher than the second frequency and the second frequency is higher than the first frequency, and the first complex signal has a first phase and the third complex signal has a third phase;
   a phase difference-calculator which calculates a phase difference between the first phase and the third phase; and
   a multi-carrier signal-determining unit which determines, on the basis of the phase difference, whether the time signal is the multi-carrier signal.

14. A power line communication circuit which performs communication by using a power line, comprising:
   a coupler separating a communication signal from an alternating voltage of the power line;
   a filter block which is connected to the coupler and to which the communication signal separated by the coupler is inputted; and
   an AD converter which is connected to the filter block and converts the communication signal passed through the filter block into a digital signal, wherein the filter block has a plurality of high-pass filters having mutually different cutoff frequencies, a plurality of low-pass filters having mutually different cutoff frequencies, a selector passing the communication signal separated by the coupler, and selecting at least one high-pass filter and one low-pass filter among the plurality of high-pass filters and the plurality of low-pass filters.

15. A multi-carrier communication method of receiving a multi-carrier signal from another multi-carrier communication apparatus via a transmission line, the method comprising:
   transforming a time domain signal received via the transmission line into a first complex signal corresponding to a first frequency, a second complex signal corresponding to a second frequency, and a third complex signal corresponding to a third complex signal, wherein the third frequency is higher than the second frequency, the second frequency is higher than the first frequency, the first complex signal has a first phase, and the third complex signal has a third phase;
   calculating a phase difference between the first phase and the third phase; and
   determining, on the basis of the phase difference, whether the time signal is the multi-carrier signal.

* * * * *